(12) United States Patent
Asami et al.

(10) Patent No.: US 7,787,196 B2
(45) Date of Patent: Aug. 31, 2010

(54) IMAGING LENS AND IMAGING APPARATUS

(75) Inventors: Taro Asami, Saitama (JP); Takashi Suzuki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/201,846

(22) Filed: Aug. 29, 2008

(65) Prior Publication Data

US 2009/0067063 A1 Mar. 12, 2009

(30) Foreign Application Priority Data

Sep. 12, 2007 (JP) ............................ P2007-236445
Jul. 28, 2008 (JP) ............................ P2008-193299

(51) Int. Cl.
*G02B 9/34* (2006.01)
(52) U.S. Cl. ....................... 359/772; 359/773
(58) Field of Classification Search ................ 359/771, 359/772, 773, 715, 686
See application file for complete search history.

(56) References Cited

U.S. PATENT DOCUMENTS

| | | | | |
|---|---|---|---|---|
| 3,827,781 | A * | 8/1974 | Ikeda | ........................ 359/747 |
| 4,310,222 | A | 1/1982 | Ikemori | |
| 4,671,626 | A | 6/1987 | Fukushima et al. | |
| 6,104,541 | A * | 8/2000 | Otomo | ........................ 359/641 |
| 6,324,018 | B1 | 11/2001 | Kawamura | |
| 7,253,972 | B2 | 8/2007 | Fujisaki et al. | |
| 2004/0190161 | A1 | 9/2004 | Yamamoto | |
| 2004/0212901 | A1 | 10/2004 | Nanba et al. | |
| 2006/0146423 | A1 * | 7/2006 | Amanai | ........................ 359/773 |
| 2006/0238898 | A1 | 10/2006 | Shinohara | |

FOREIGN PATENT DOCUMENTS

| | | |
|---|---|---|
| EP | 1 757 967 A2 | 2/2007 |
| JP | 6-75163 A | 3/1994 |
| JP | 6-94992 A | 4/1994 |
| JP | 9-43508 A | 2/1997 |
| JP | 10-10425 | 1/1998 |
| JP | 11-237547 A | 8/1999 |
| JP | 2000-249913 A | 9/2000 |
| JP | 2004-325713 A | 11/2004 |
| JP | 2005-202019 | 7/2005 |
| JP | 2006-030290 A | 2/2006 |
| JP | 2006-64829 A | 3/2006 |
| JP | 2006-91715 A | 4/2006 |
| JP | 2006-91718 A | 4/2006 |
| JP | 2007-34314 A | 2/2007 |
| JP | 2007-218947 A | 8/2007 |

OTHER PUBLICATIONS

Office Action dated Oct. 23, 2009 issued by the European Patent Office in the corresponding European Application No. 08 015 305.9-1234.

* cited by examiner

*Primary Examiner*—Alicia M Harrington
(74) *Attorney, Agent, or Firm*—Birch, Stewart, Kolasch & Birch, LLP

(57) ABSTRACT

An imaging lens is provided and includes: in order from an object side of the imaging lens, a first lens group having a positive power as a whole; a second lens group, in which an object-side surface of a lens closest to the object side is concave toward the object side; a third lens group of a single lens having a positive power; and a fourth lens group having a negative power as a whole.

29 Claims, 25 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

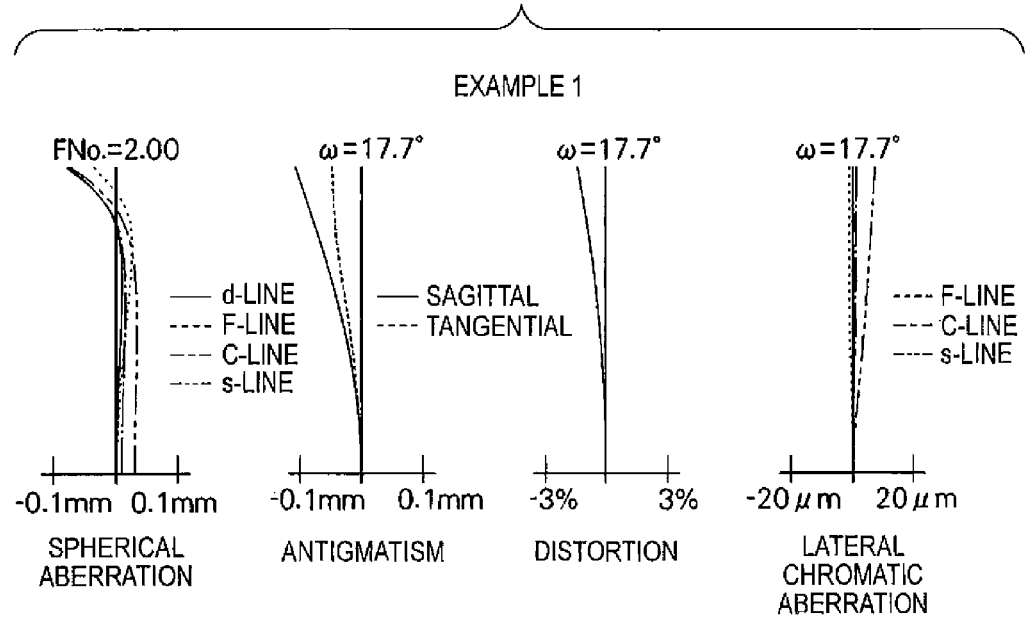
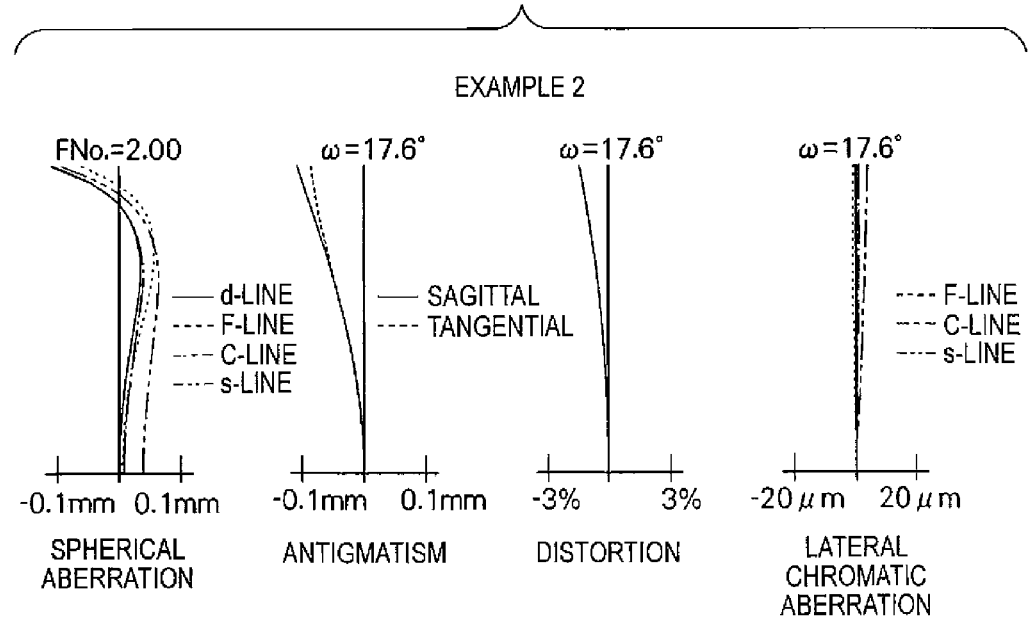

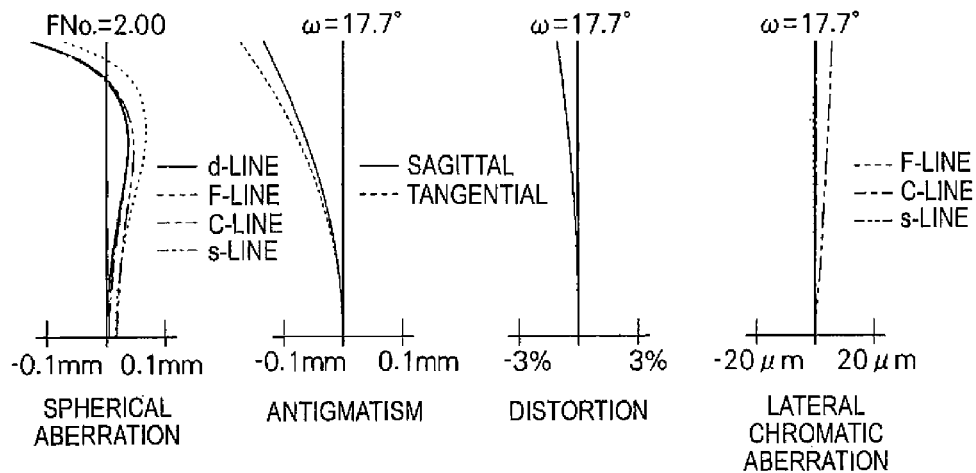
FIG. 23 — EXAMPLE 7
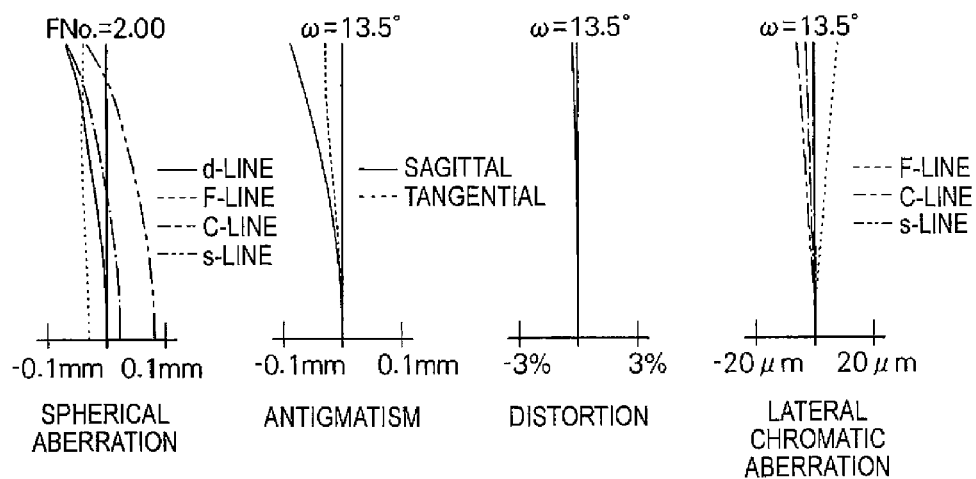
FIG. 24 — EXAMPLE 8

EXAMPLE 9

EXAMPLE 10

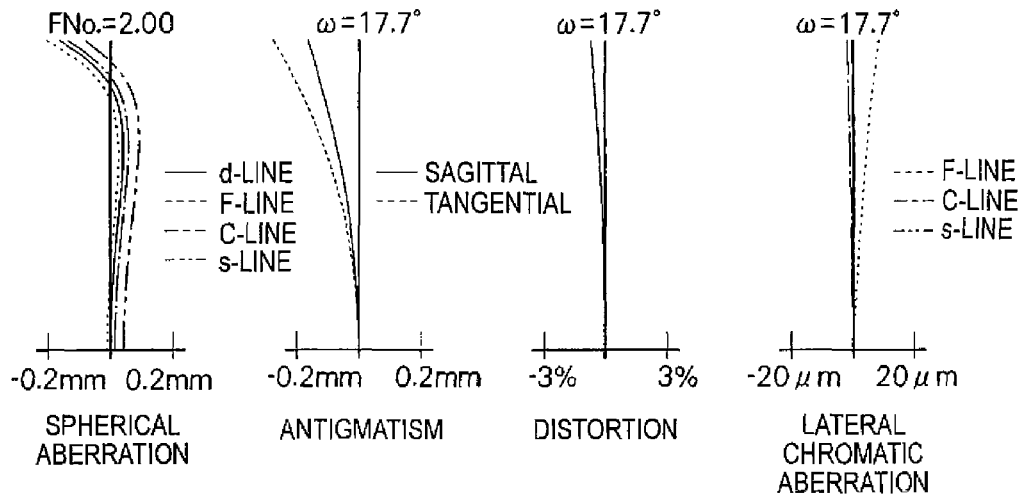
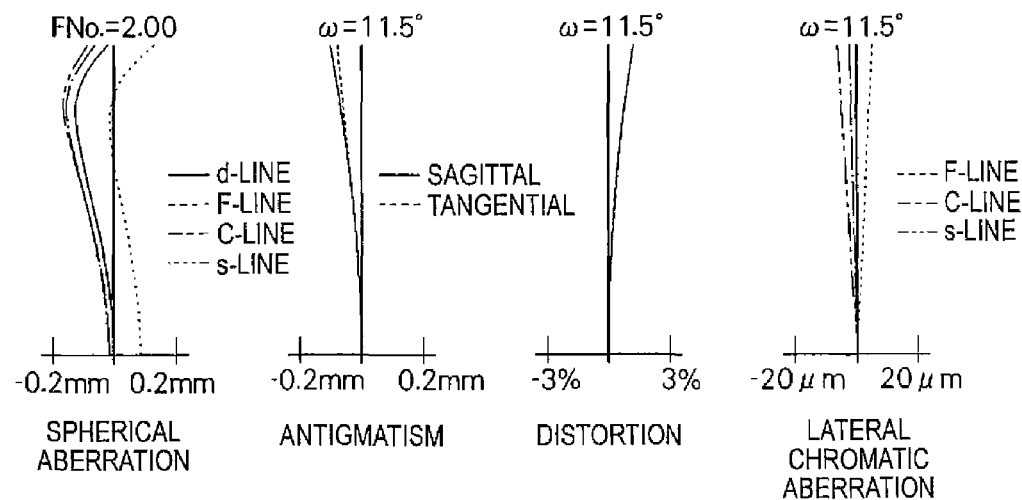

EXAMPLE 13

EXAMPLE 14

IMAGING LENS AND IMAGING APPARATUS

This application is based on and claims priority under 35 U.S.C §119 from Japanese Patent Application Nos. 2007-236445 and 2008-193299, filed on Sep. 12, 2007 and Jul. 28, 2008, respectively, the entire disclosure of which is herein incorporated by reference.

BACKGROUND OF THE INVENTION

1. Field of the Invention

The present invention relates to an imaging lens and an imaging apparatus, more particularly, to an imaging lens suitable to be used in a surveillance camera, a cell phone camera, an onboard camera, and the like employing an imaging device such as a CCD (Charge Coupled Device) and a CMOS (Complementary Metal Oxide Semiconductor), and an imaging apparatus having the imaging lens.

2. Description of Related Art

Recently, imaging devices such as CCD and CMOS have been excessively downsized and the number of pixels of those has been excessively increased. In addition, an imaging apparatus main body having the imaging device has been also downsized, and thus it is also required to unweight and downsize an imaging lens mounted therein.

Meanwhile, in an onboard camera, a surveillance camera, and the like, there is required a small-sized and high-performance lens that has high antiweatherability in the range from outside air in a cold region to a vehicle inside in summer of a tropical region and can be used in the wide temperature range. Particularly, in the camera disposed in a vehicle to observe the front side thereof, there is required a lens usable in the wide wavelength range from the visible band to the infrared band. In addition, in case of the onboard camera, there is also required a lens of which only a small part is exposed to the outside in consideration of an exterior view of a vehicle.

In JP-A-2006-64829, JP-A-2006-91715 and JP-A-2006-91718, as a lens usable in the wide wavelength range from the visible band to the near-infrared band, there was disclosed a telephoto lens system having a four group configuration that includes, in order from the object side, a first lens group having a positive power, a second lens group having a positive or negative power, a third lens group having a negative power, and a fourth lens group having a positive power. In the lens system disclosed in JP-A-2006-64829, JP-A-2006-91715 and JP-A-2006-91718, a lens closest to the object side in the second lens group has a convex surface on the object side, and an aperture diaphragm is disposed between the third lens group and the fourth lens group.

However, in JP-A-2006-64829, JP-A-2006-91715 and JP-A-2006-91718, the aperture diaphragm is disposed closer to the image side than the third lens group. Since the aperture diaphragm is located close to the image plane, a light ray height in the lens closest to the object side increases. Thus, there is a disadvantage that a diameter of the lens becomes large. Particularly, in the onboard camera, it is preferred that an exposed area of the lens surface be small in an exterior view, and so it is preferred that a diameter of the lens be small.

SUMMARY OF THE INVENTION

An object of an illustrative, non-limiting embodiment of the invention is to provide an imaging lens which can achieve a decrease in size and weight while maintaining good optical performance, and an imaging apparatus having the imaging lens.

According to an aspect of the invention, there is provided an imaging lens including: in order from an object side of the imaging lens, a first lens group having a positive power as a whole; a second lens group, in which an object-side surface of a lens closest to the object side is concave toward the object side; a third lens group of a single lens having a positive power; and a fourth lens group having a negative power as a whole.

The image lens is a lens system including four groups having the lens configurations as mentioned above, and by properly selecting each of the lens configurations, it is possible to obtain a performance advantageous in a decrease in size and weight while maintaining good optical performance. In particular, the object-side surface of a lens closest to the object side in the second lens group is configured to be concave toward the object side. Thus, it is possible to satisfactorily correct field curvature and spherical aberration, and it is also possible to downsize a lens diameter in a diametrical direction by refracting off-axis rays along an optical axis.

In the imaging lens, when a distance on the optical axis from a surface closest to the object side in the first lens group to an image plane is L, a distance on the optical axis from a surface closest to an image side in a lens group that is closest to the image side of the imaging lens to the image plane is Bf, and a focal length of the whole system (the imaging lens) is f, the imaging lens may satisfy at least one of the following conditional expressions (1) and (2). Either of the following conditional expressions (1) and (2) may be satisfied, or both of the following conditional expressions (1) and (2) may be satisfied.

$$0.8 < L/f < 1.7 \tag{1}$$

$$0.2 < Bf/f < 0.4 \tag{2}$$

In the imaging lens, an image-side surface of a lens closest to the image side in the second lens group may be convex toward the image side In this case, the second lens group may be a cemented lens including, in order from the object side, a lens having a concave surface on the object side and a lens having a convex surface on the image side.

In the imaging lens, the first lens group may be a single lens having a convex surface on the object side, and the fourth lens group may be a cemented lens including, in order from the object side, a lens having a concave surface on the object side and a lens having a convex surface on the image side.

Alternatively, the first lens group may be a single lens having a convex surface on the object side, and the fourth lens group may be a single meniscus lens having a concave surface on the object side.

In the imaging lens, when a focal length of the second lens group is $f_2$ and the focal length of the whole system is f, the imaging lens may satisfy the following conditional expression (3).

$$-1.0 < f/f_2 < 1.0 \tag{3}$$

In addition, when a radius of curvature of a surface closest to the object side in the second lens group is $R_{2A}$ and a radius of curvature of a surface closest to the image side in the second lens group is $R_{2B}$, the imaging lens may satisfy the following conditional expression (4).

$$0.3 < R_{2A}/R_{2B} < 1.5 \tag{4}$$

In the imaging lens, the second lens group may include a lens having a negative power, and an Abbe number of at least one negative lens included in the second lens group may be 40 or less at the d-line.

In addition, a stop may be disposed closer to the object side than a lens closest to the object side in the second lens group.

In the imaging lens, when a distance from a vertex of a surface closest to the object side in the first lens group to an entrance pupil is ENP and a distance on the optical axis from the surface closest to the object side in the first lens group to the image plane is L, the imaging lens may satisfy the following conditional expression (5).

$$ENP/L<0.5 \tag{5}$$

In addition, the fourth group may include a cemented lens, and when an Abbe number of a lens closest to the object side in the cemented lens at the d-line is $v_{F4}$ and an Abbe number of a lens closest to the image side in the cemented lens at the d-line is $v_{R4}$, the imaging lens may satisfy the following conditional expression (6).

$$v_{F4}/v_{R4}>1.0 \tag{6}$$

In addition, when a focal length of the fourth lens group is $f_4$ and the focal length of the whole system is f, the imaging lens may satisfy the following conditional expression (7).

$$-3.0<f_4/f<-0.5 \tag{7}$$

In addition, when a distance on the optical axis from a surface closest to the object side to a surface closest to the image side in the second lens group is $D_2$, the imaging lens may satisfy the following conditional expression (8).

$$3.5<D_2<6.0 \tag{8}$$

In the imaging lens, an effective diameter of the whole system may be 15 mm or less.

In calculating of L and Bf as mentioned above, air-converted distance is used for the back focal length.

Further, values of the conditional expressions (1) to (8) are obtained when d-line (wavelength 587.6 nm) is set as a reference wavelength. In the present specification, the d-line is assumed as a reference wavelength if there is no specific description.

According to another aspect of the invention, there is provided an imaging apparatus including: the imaging lens as described above; and an imaging device which converts an optical image formed by the imaging lens into an electric signal.

BRIEF DESCRIPTION OF THE DRAWINGS

The features of the invention will appear more fully upon consideration of the exemplary embodiment of the invention, which are schematically set forth in the drawings, in which:

FIG. 17 is a diagram showing various aberrations of the imaging lens according to Example 1;

FIG. 18 is a diagram showing various aberrations of the imaging lens according to Example 2;

FIG. 23 is a diagram showing various aberrations of the imaging lens according to Example 7;

FIG. 24 is a diagram showing various aberrations of the imaging lens according to Example 8;

FIG. 27 is a diagram showing various aberrations of the imaging lens according to Example 11;

FIG. 28 is a diagram showing various aberrations of the imaging lens according to Example 12;

DETAILED DESCRIPTION OF THE EXEMPLARY EMBODIMENTS

According to an exemplary embodiment of the invention, the image lens is a lens system including four groups having the lens configurations as mentioned above, and by properly selecting each of the lens configurations, it is possible to obtain a performance advantageous in a decrease in size and weight while maintaining good optical performance.

Hereinafter, exemplary embodiments of the invention will be described in detail with reference to the drawings. First, an imaging lens according to an exemplary embodiment of the invention will be described, and then an imaging apparatus according to an exemplary embodiment of the invention will be described.

Figure 1:
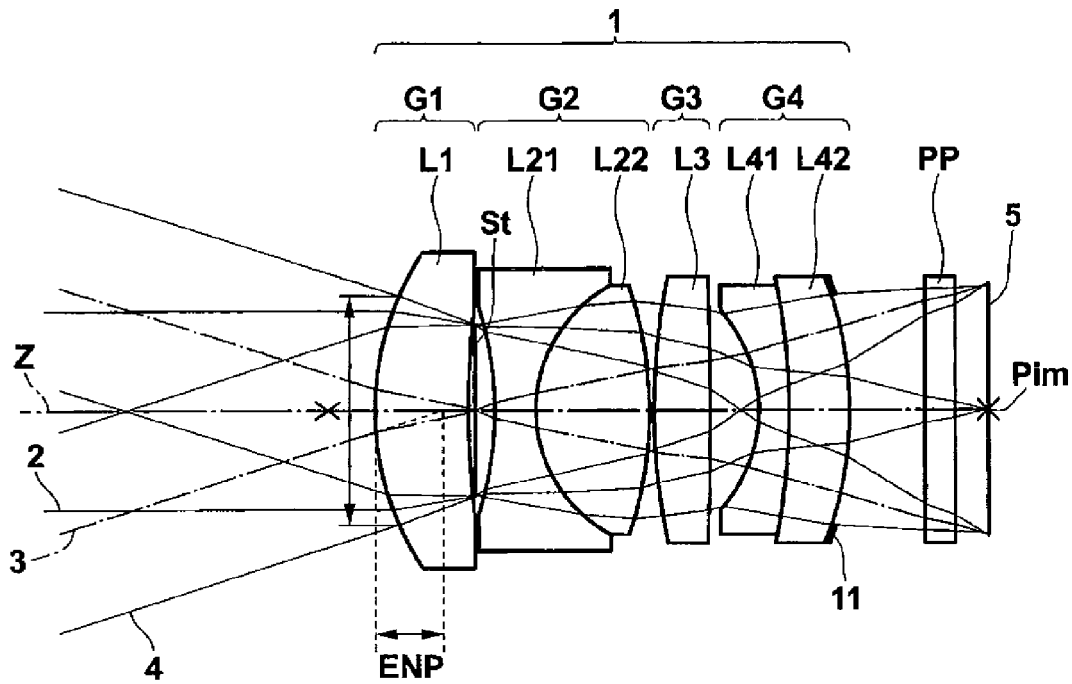
FIG. 1 is an optical path diagram showing an imaging lens according to an exemplary embodiment of the invention.

FIG. 1 shows a lens sectional view of an imaging lens 1 according to an exemplary embodiment of the invention. FIG. 1 also shows an outermost marginal ray 2 of on-axis rays, a principal ray 3 of off-axis rays, and an outermost marginal ray 4 of the off-axis rays. In addition, an exemplary configuration shown in FIG. 1 corresponds to a lens configuration according to Example 1 to be described later in FIG. 2. In addition, FIGS. 3 to 16 show lens sectional views of imaging lenses according to an exemplary embodiment of the invention, and those correspond to lens configurations according to Examples 2 to 15 to be described later.

The imaging lens according to an exemplary embodiment of the invention includes, in order from the object side, a first lens group G1 having a positive power as a whole, a second lens group G2, in which an object-side surface of a lens closest to the object side is concave toward the object side, a third lens group G3 of a single lens having a positive power, and a fourth lens group G4 having a negative power as a whole.

In FIGS. 1 to 16, considering a case where an imaging lens is applied to an imaging apparatus, there is also shown an imaging device 5 disposed on an image plane including an imaging position Pim of the imaging lens. The imaging device 5 is operative to convert an optical image formed by the imaging lens into an electric signal, and is constituted by, for example, a CCD image sensor and the like.

When the imaging device 5 is applied to the imaging apparatus, it is preferred to disposed a cover glass, a low pass filter, an infrared-cut film, or the like in accordance with a configuration of a camera side on which the lens system is mounted. In FIGS. 1 and 2 and FIGS. 4 to 16, there is shown an example in which an optical member PP assumed as one of those and having a plane parallel plate shape is disposed between the lens system and the imaging device 5. For example, when the imaging lens is used in an onboard camera as a night vision camera for eyesight at nighttime, for example, a filter for cutting blue light from ultraviolet light may be disposed between the lens system and the imaging device.

A filter of various types such as a low pass filter or the like for cutting a specific wavelength band may be disposed between the lens system and the imaging device 5. Instead, the filter of various types may be disposed between the respective lenses. Alternatively, a coating having the same effect as the filters of various types may be performed on a surface of any one lens among the first lens group G1 to fourth lens group G4.

The first lens group G1 may be only a single lens having a convex surface on the object side. By making the first lens group G1 as the single lens having a convex surface on the object side and having a positive power, it is possible to satisfactorily correct comatic aberration. In addition, since the first lens group G1 is the single lens, it is possible to reduce the number of lens elements and it is also possible to achieve a decrease in size, weight, and cost. The first lens group G1 may include a plurality of lenses.

In the second lens group G2, the object-side surface of the lens closest to the object side is concave toward the object side, and thus it is possible to satisfactorily correct field curvature and spherical aberration. Accordingly, it is possible to obtain good optical performance while maintaining a small F number. Simultaneously, it is possible to refract off-axis rays along the optical axis, and thus it is possible to downsize the lens system in a diametrical direction.

In addition, the image-side surface of the lens closest to the image side in the second lens group G2 may be convex toward the image side. In this case, it is possible to more satisfactorily correct field curvature.

The second lens group G2 may be a single lens, or may include a plurality of lenses. In a case where the second lens group G2 is a single lens, the second lens group G2 may be a meniscus lens having a concave surface on the object side.

In addition, in a case where the second lens group G2 is constituted by two lenses, for example, the second lens group G2 may be a cemented lens by cementing, in order from the object side, a lens having a concave surface on the object side and a lens having a convex surface on the image side. In the second lens group G2, the surface closest to the object side is formed as a concave surface and the surface closest to the image side is formed as a convex surface. Thus, it is possible to satisfactorily correct field curvature. In addition, the second lens group G2 is a cemented lens, and thus it is possible to satisfactorily correct lateral chromatic aberration and longitudinal chromatic aberration in the wide wavelength range from the visible band to the infrared band.

In a case where the second lens group G2 includes a cemented lens, the cemented lens may be formed by cementing a positive lens and a negative lens in view of chromatic aberration correction. In this case, the cemented lens may be formed by cementing, in order from the object side, a negative lens having a concave surface on the object side and a positive lens having a convex surface on the image side. Alternatively, the cemented lens may be formed by cementing, in order from the object side, a positive lens having a concave surface on the object side and a negative lens having a convex surface on the image side.

In a case where the second lens group G2 includes a cemented lens formed by cementing a positive lens and a negative lens, the positive lens may be a biconvex lens. With such a configuration, it is possible to increase the positive power, which is advantageous in aberration correction.

In addition, in a case where the second lens group G2 includes a negative lens, an Abbe number of the negative lens may be 40 or less at the d-line. By selecting a material satisfying the condition as mentioned above, it is possible to satisfactorily correct longitudinal chromatic aberration and lateral chromatic aberration.

The second lens group G2 may have a positive power as a whole, or may have a negative power as a whole.

The third lens group G3 may be only a single lens having a convex surface on the object side. By making the third lens group G3 as only a single lens having a convex surface on the object side, it is possible to satisfactorily correct spherical aberration. The single lens having a positive power in the third lens group G3 may be configured so that an absolute value of a radius of curvature of the object-side surface is not more than an absolute value of a radius of curvature of the image-side surface. In this case, it is possible to more satisfactorily correct spherical aberration and comatic aberration. In addition, by making the third lens group G3 as only a single lens, it is possible to decrease a length of the whole system as compared with a case of employing a plurality of lenses. Thus, it is possible to achieve downsizing.

The fourth lens group G4 may be a single lens, or may include a plurality of lenses. In a case where the fourth lens group G4 is a single lens, the fourth lens group G4 may be a meniscus lens having a concave surface on the object side.

In a case where the fourth lens group G4 is constituted by two lenses, for example, the fourth lens group G4 may be a cemented lens by cementing, in order from the object side, a lens having a concave surface on the object side and a lens having a convex surface on the image side. In addition, the fourth lens group G4 is a cemented lens, and thus it is possible to satisfactorily correct lateral chromatic aberration and longitudinal chromatic aberration in the wide wavelength range from the visible band to the infrared band.

In a case where the fourth lens group G4 includes a cemented lens, the cemented lens may be formed by cementing a positive lens and a negative lens in view of chromatic aberration correction. In this case, the positive lens may be disposed on the object side, or the positive lens may be disposed on the image side. In addition, the cemented lens included in the fourth lens group G4 may be formed by cementing a negative lens and a negative lens.

In a case where the fourth lens group G4 includes a cemented lens, an Abbe number of the negative lens may be 40 or less at the d-line. In this case, it is possible to satisfactorily correct longitudinal chromatic aberration and lateral chromatic aberration.

Here, in FIGS. 1 to 9 and FIGS. 12 and 13, imaging lenses are configured as four groups having six lenses, and an aperture diaphragm St as a stop is disposed between the first lens group G1 and the second lens group G2. Specifically, each of these imaging lenses include a first lens group G1 of a lens L1, a second lens group G2 of a cemented lens by cementing a lens L21 and a lens L22, a third lens group G3 of a lens L3, and a fourth lens group G4 of a cemented lens by cementing a lens L41 and a lens L42.

Figure 10:
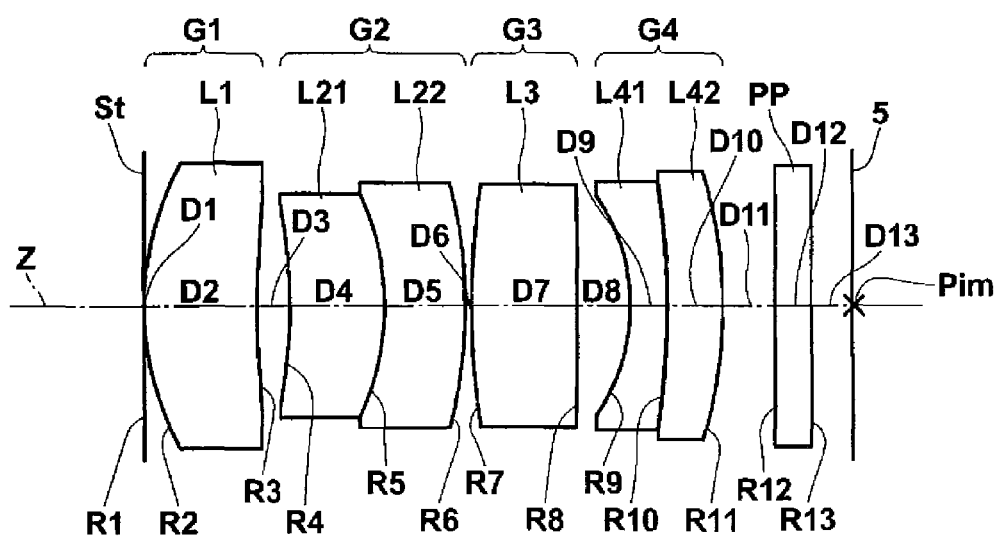
FIG. 10 is a sectional diagram showing a configuration of an imaging lens according to Example 9.

In FIG. 10, an imaging lens is configured as four groups having six lenses, and an aperture diaphragm St as a stop is disposed closer to the object than the first lens group G1. The imaging lens shown in FIG. 10 includes a first lens group G1 of a lens L1, a second lens group G2 of a cemented lens by cementing a lens L21 and a lens L22, a third lens group G3 of a lens L3, and a fourth lens group G4 of a cemented lens by cementing a lens L41 and a lens L42.

Figure 11:
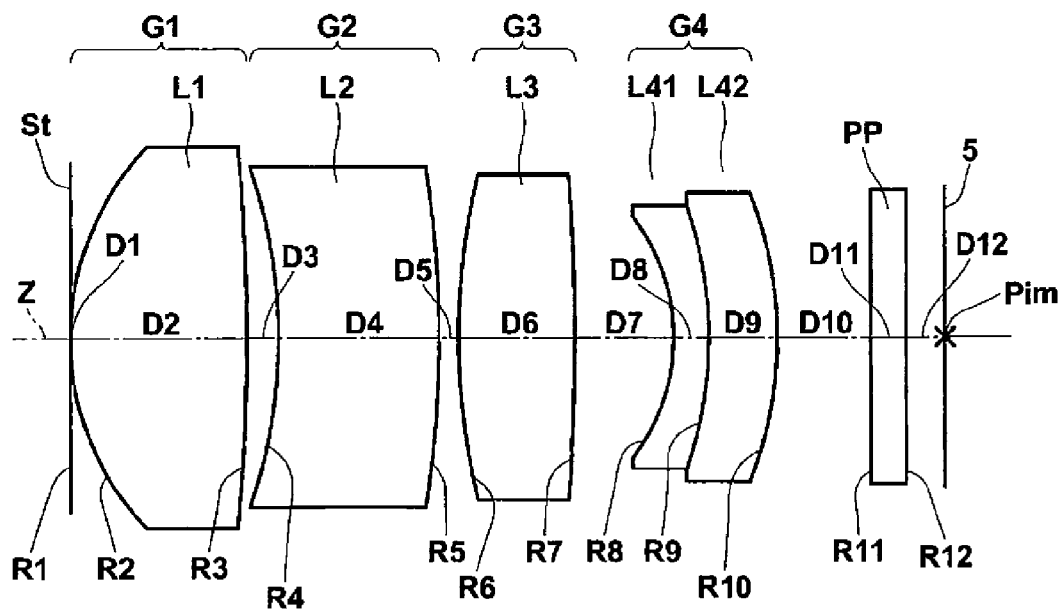
FIG. 11 is a sectional diagram showing a configuration of an imaging lens according to Example 10.

In addition, in FIG. 11, an imaging lens is configured as four groups having five lenses, and an aperture diaphragm St as a stop is disposed closer to the object than the first lens group G1. The imaging lens shown in FIG. 11 includes a first lens group G1 of a lens L1, a second lens group G2 of a lens L2, a third lens group G3 of a lens L3, and a fourth lens group G4 of a cemented lens by cementing a lens L41 and a lens L42.

Figure 14:
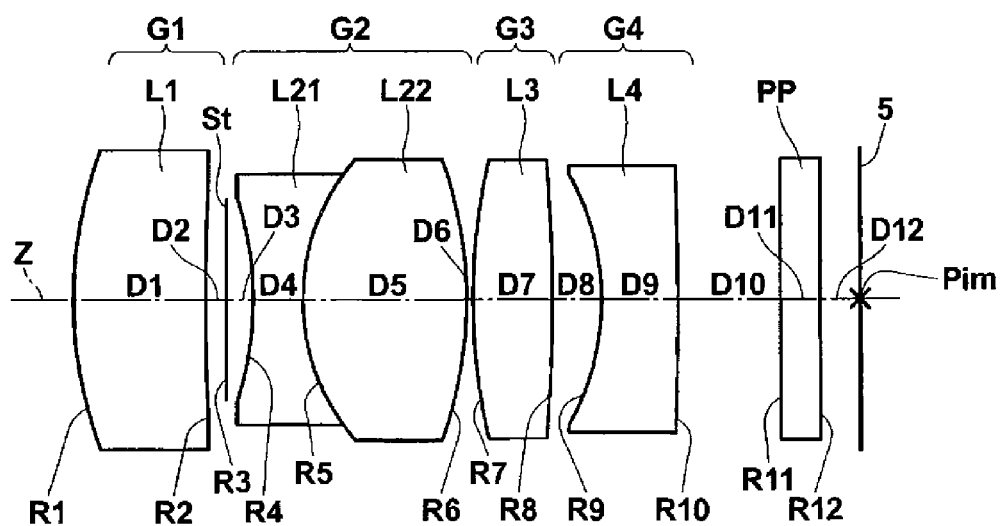
FIG. 14 is a sectional diagram showing a configuration of an imaging lens according to Example 13.
Figure 15:
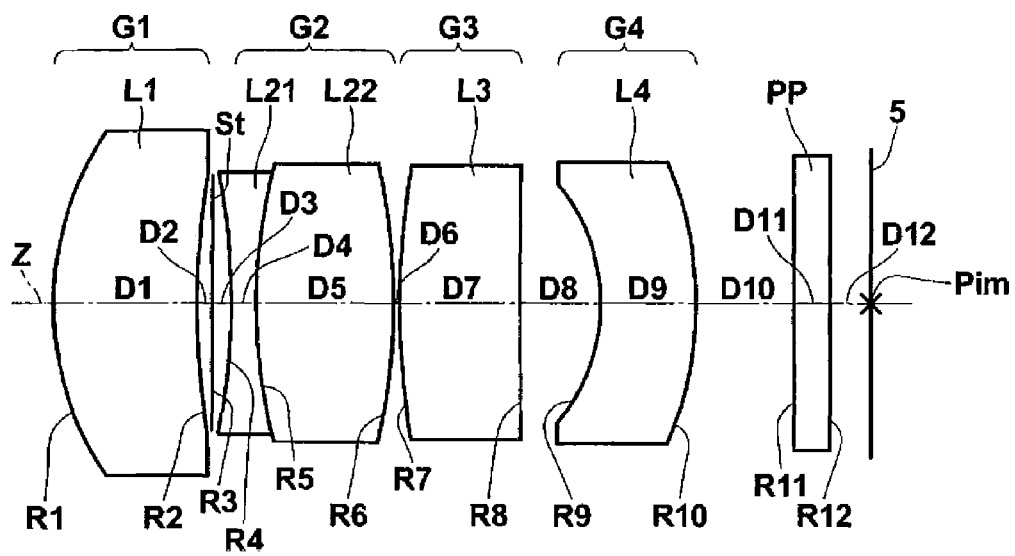
FIG. 15 is a sectional diagram showing a configuration of an imaging lens according to Example 14.
Figure 16:
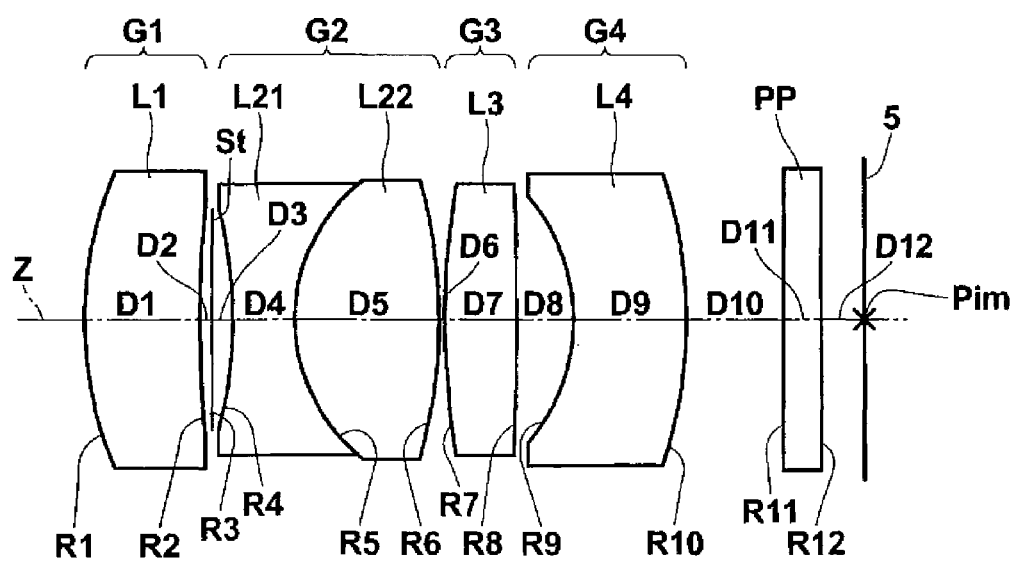
FIG. 16 is a sectional diagram showing a configuration of an imaging lens according to Example 15.
Figure 19:
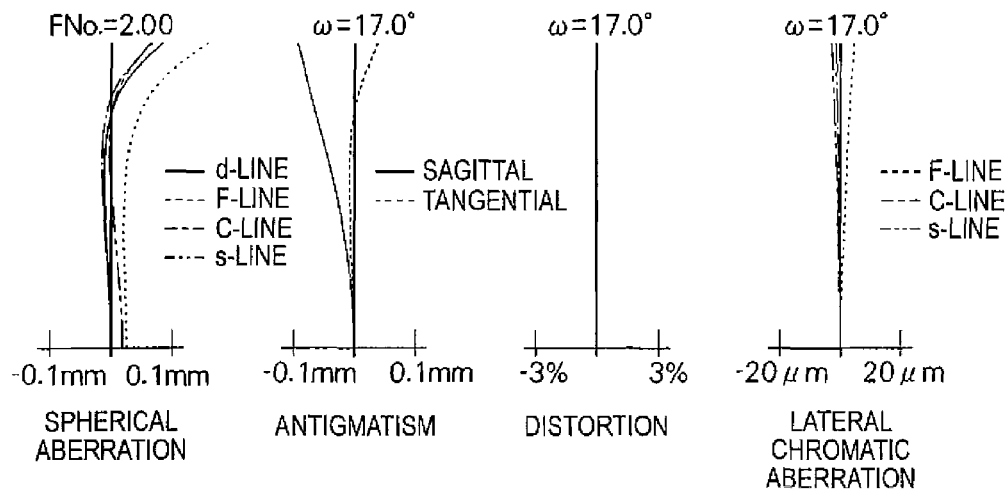
FIG. 19 is a diagram showing various aberrations of the imaging lens according to Example 3.
Figure 20:
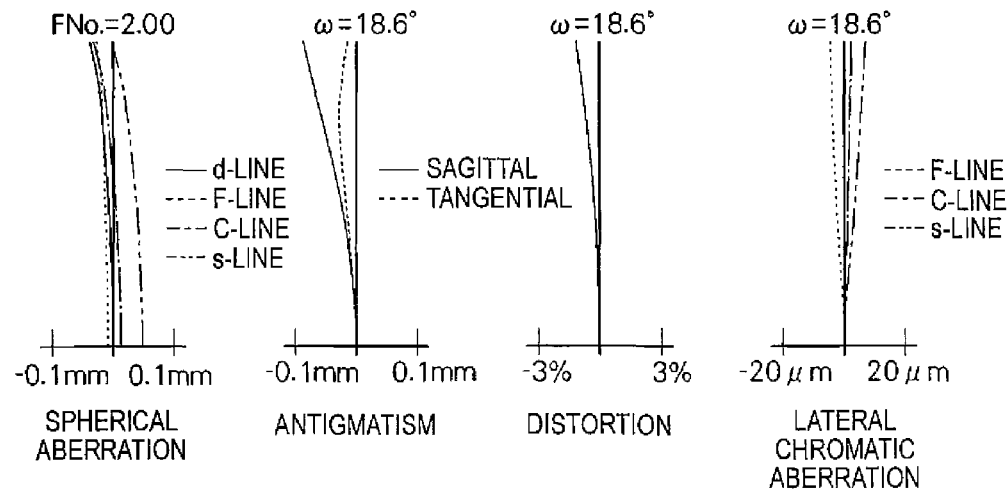
FIG. 20 is a diagram showing various aberrations of the imaging lens according to Example 4.
Figure 21:
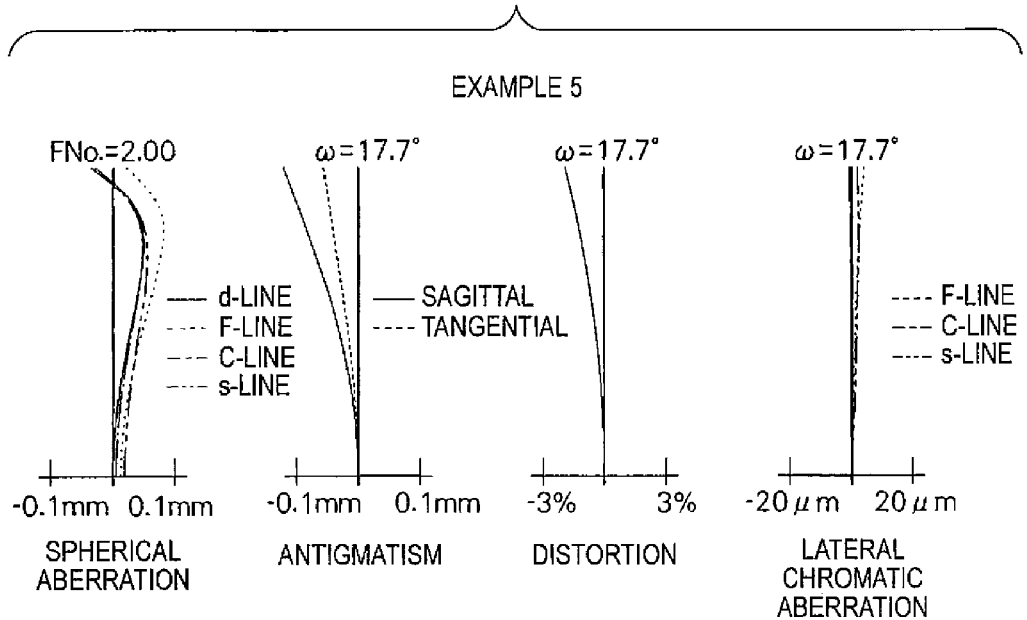
FIG. 21 is a diagram showing various aberrations of the imaging lens according to Example 5.
Figure 22:
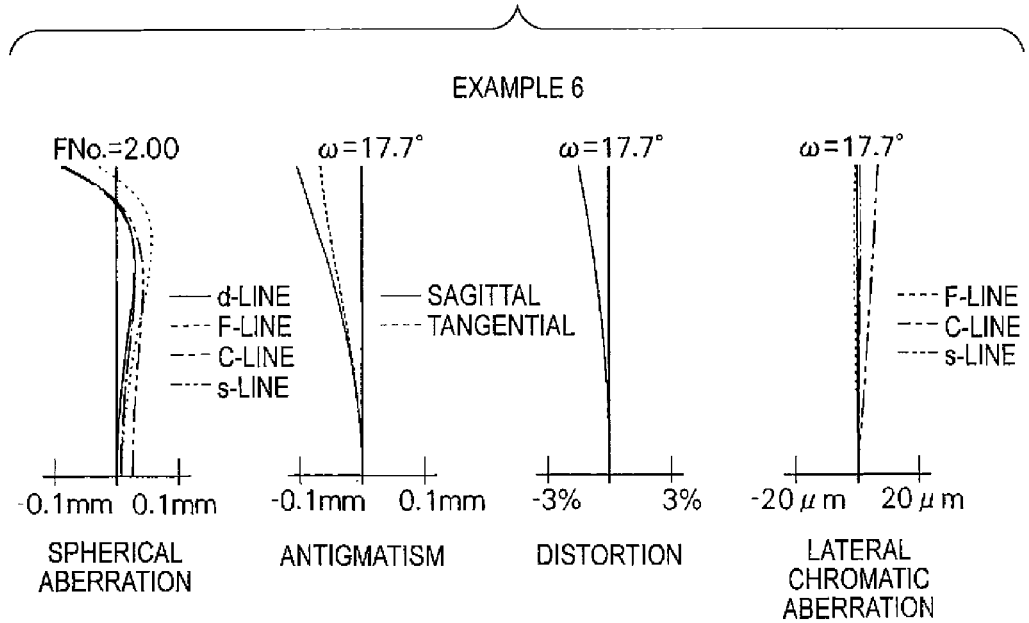
FIG. 22 is a diagram showing various aberrations of the imaging lens according to Example 6.
Figure 25:
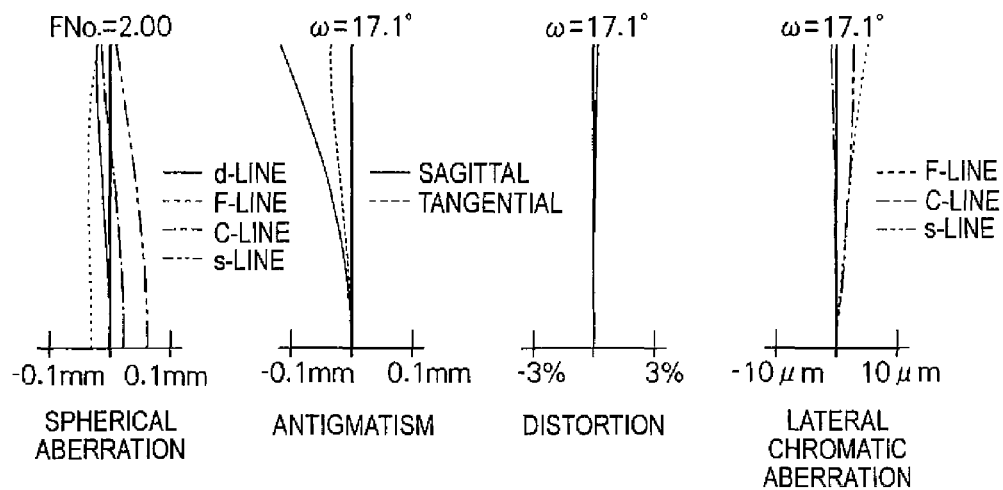
FIG. 25 is a diagram showing various aberrations of the imaging lens according to Example 9.
Figure 26:
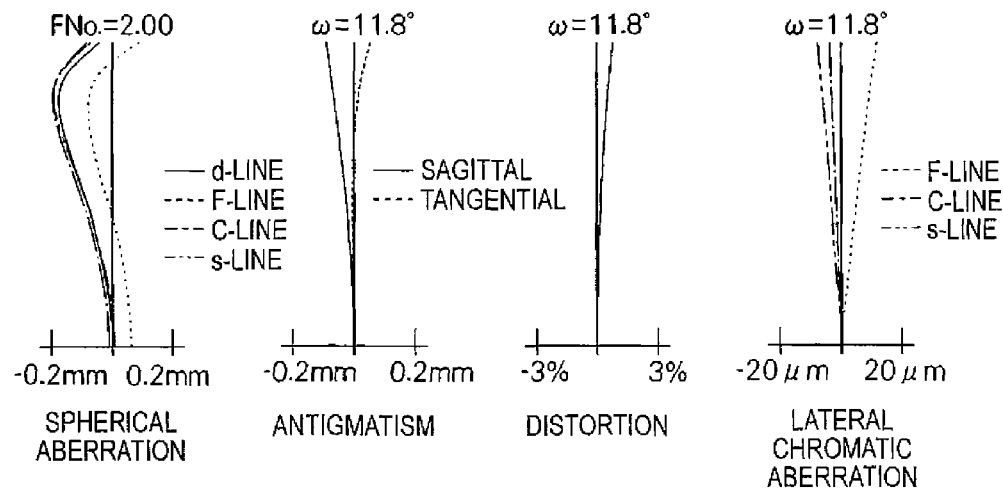
FIG. 26 is a diagram showing various aberrations of the imaging lens according to Example 10.
Figure 29:
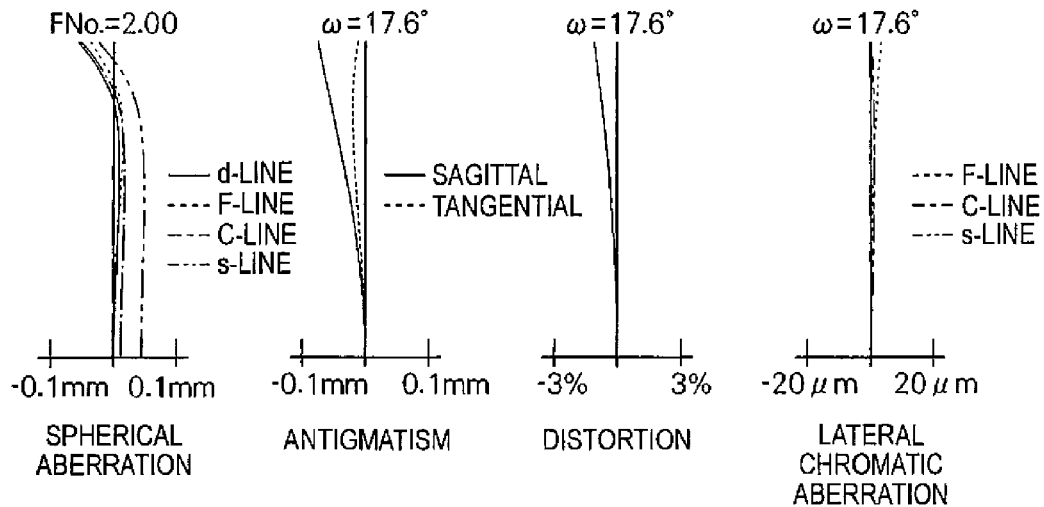
FIG. 29 is a diagram showing various aberrations of the imaging lens according to Example 13.
Figure 30:
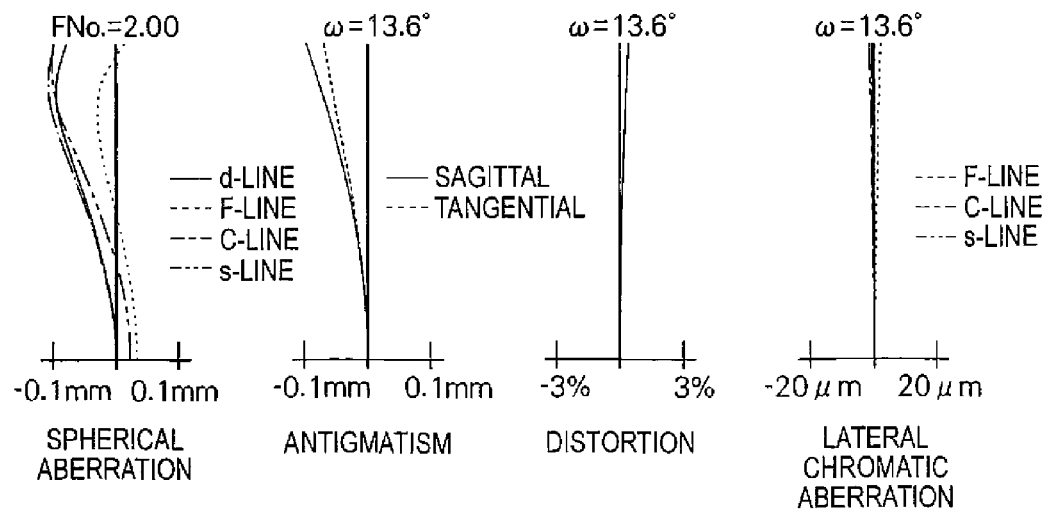
FIG. 30 is a diagram showing various aberrations of the imaging lens according to Example 14.
Figure 31:
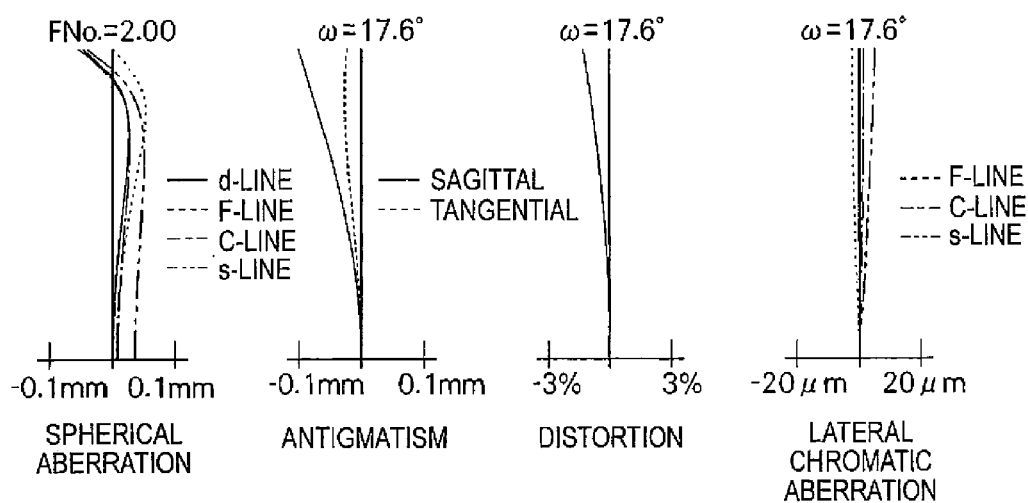
FIG. 31 is a diagram showing various aberrations of the imaging lens according to Example 15.
Figure 32:
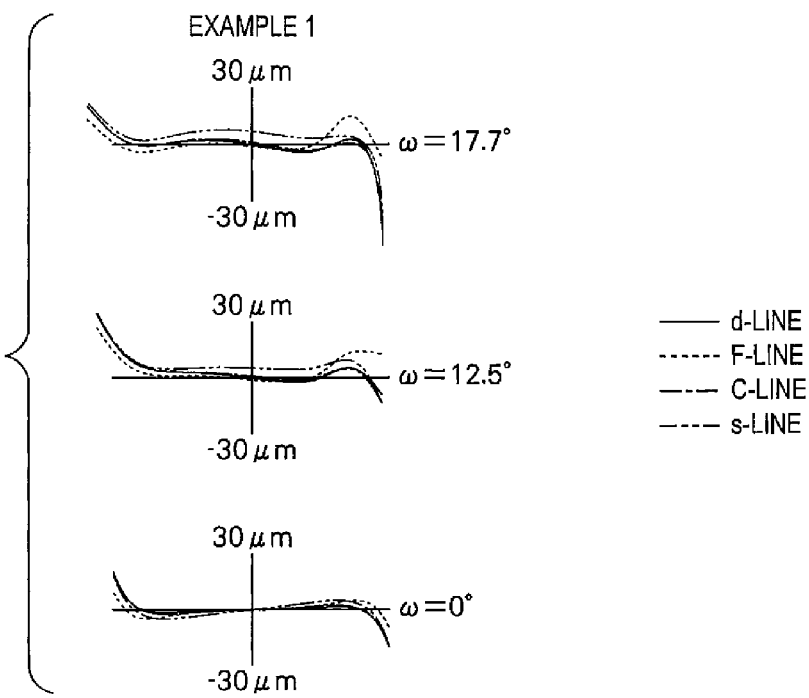
FIG. 32 is a diagram showing comatic aberrations of the imaging lens according to Example 1.
Figure 33:
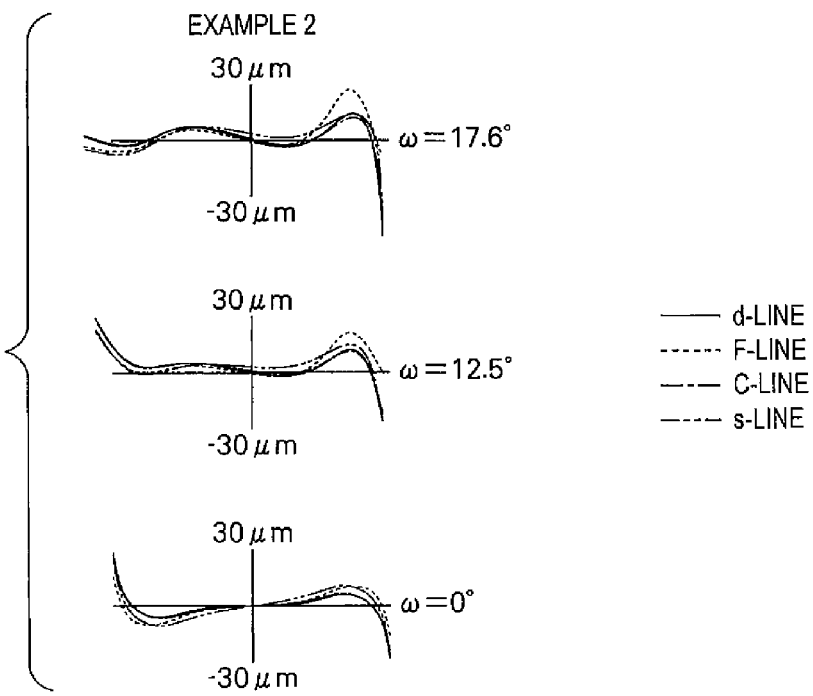
FIG. 33 is a diagram showing comatic aberrations of the imaging lens according to Example 2.
Figure 34:
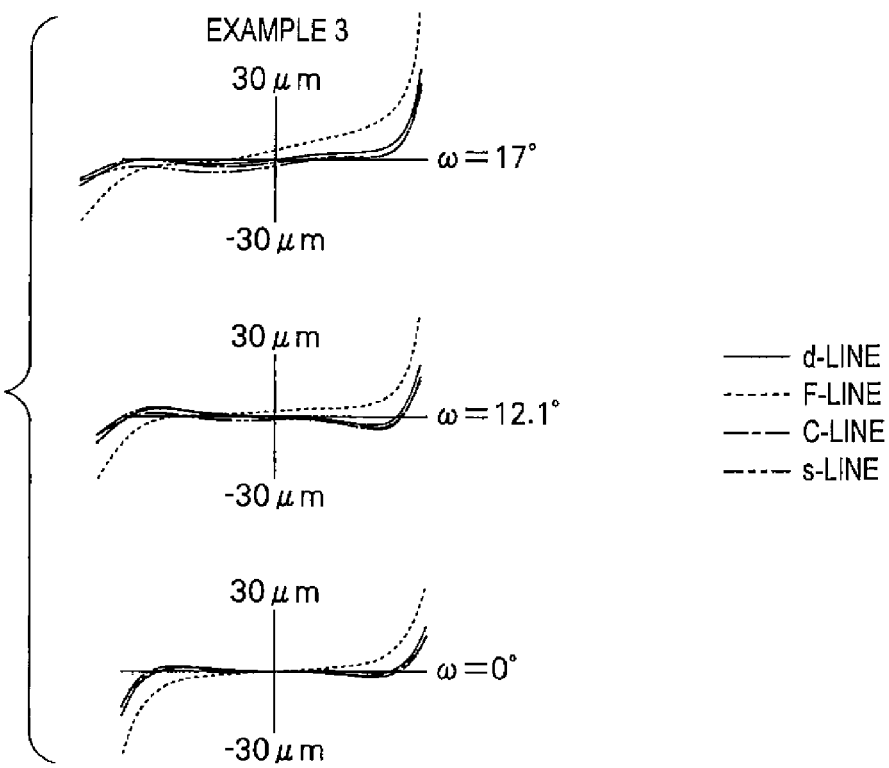
FIG. 34 is a diagram showing comatic aberrations of the imaging lens according to Example 3.
Figure 35:
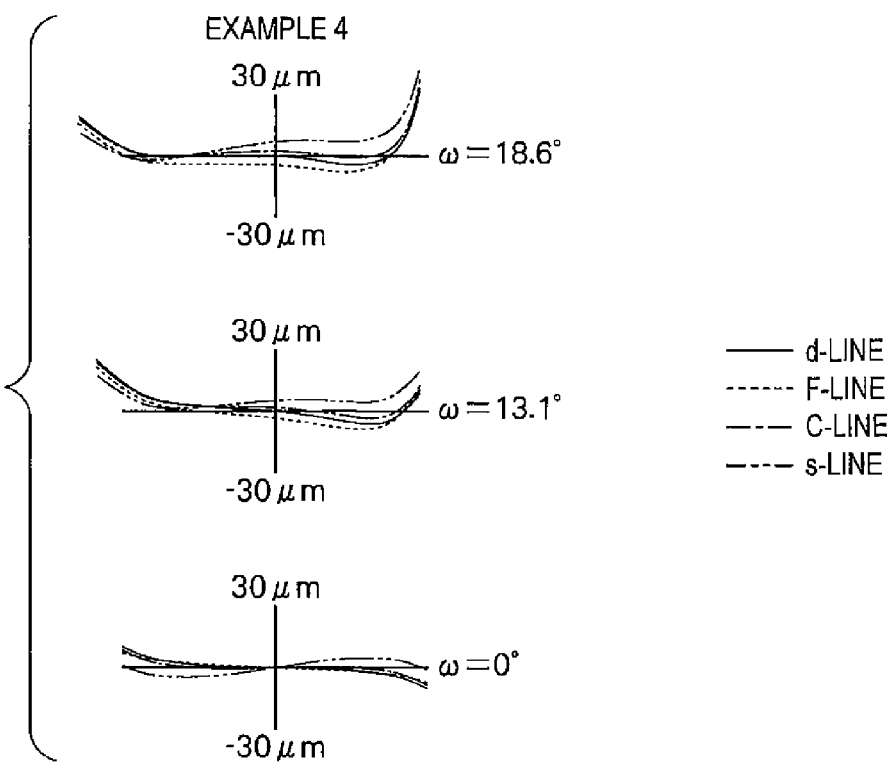
FIG. 35 is a diagram showing comatic aberrations of the imaging lens according to Example 4.
Figure 36:
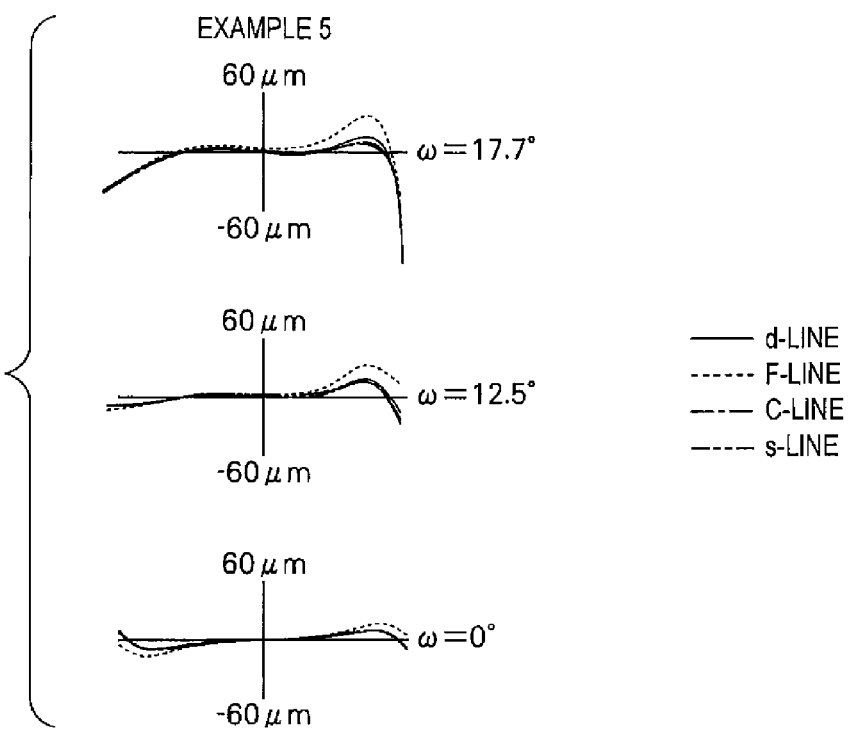
FIG. 36 is a diagram showing comatic aberrations of the imaging lens according to Example 5.
Figure 37:
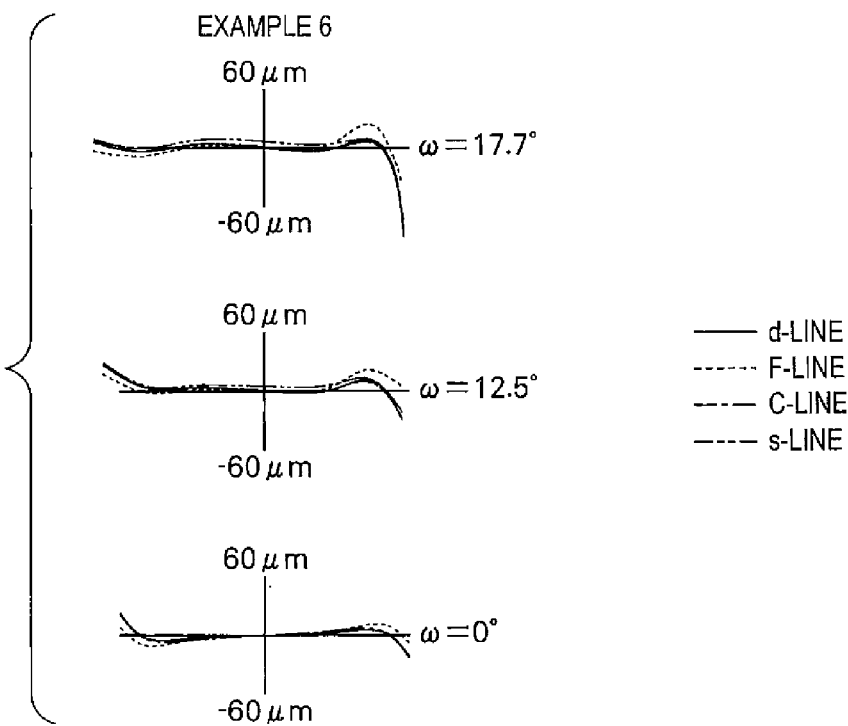
FIG. 37 is a diagram showing comatic aberrations of the imaging lens according to Example 6.
Figure 38:
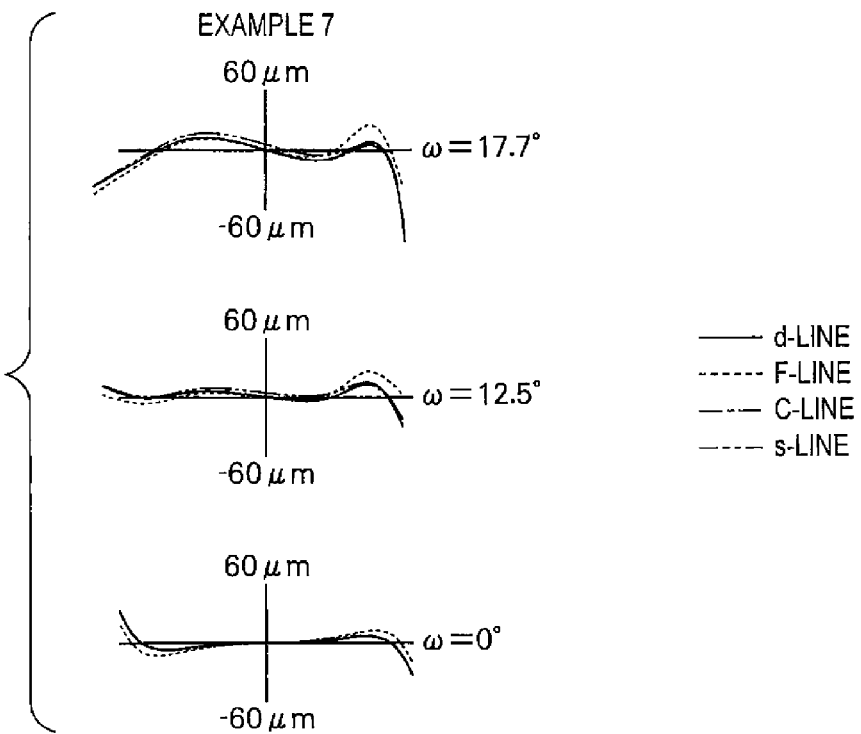
FIG. 38 is a diagram showing comatic aberrations of the imaging lens according to Example 7.
Figure 39:
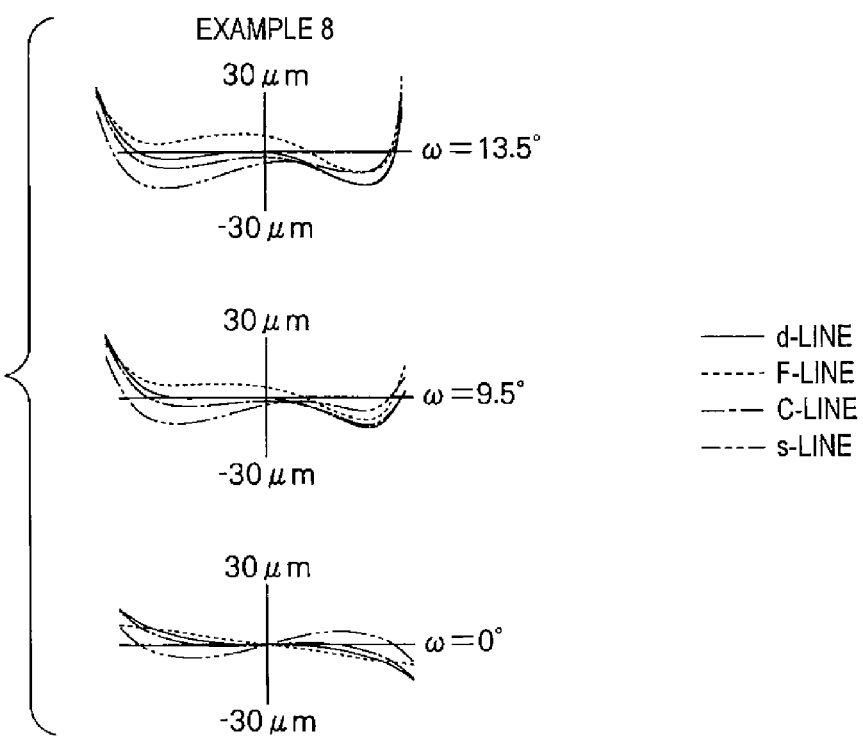
FIG. 39 is a diagram showing comatic aberrations of the imaging lens according to Example 8.
Figure 40:
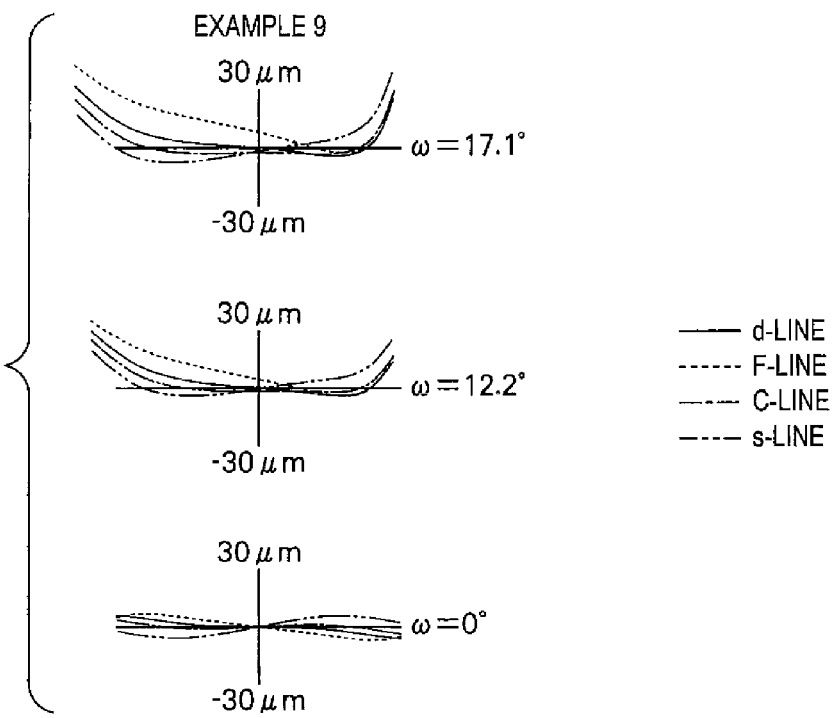
FIG. 40 is a diagram showing comatic aberrations of the imaging lens according to Example 9.
Figure 41:
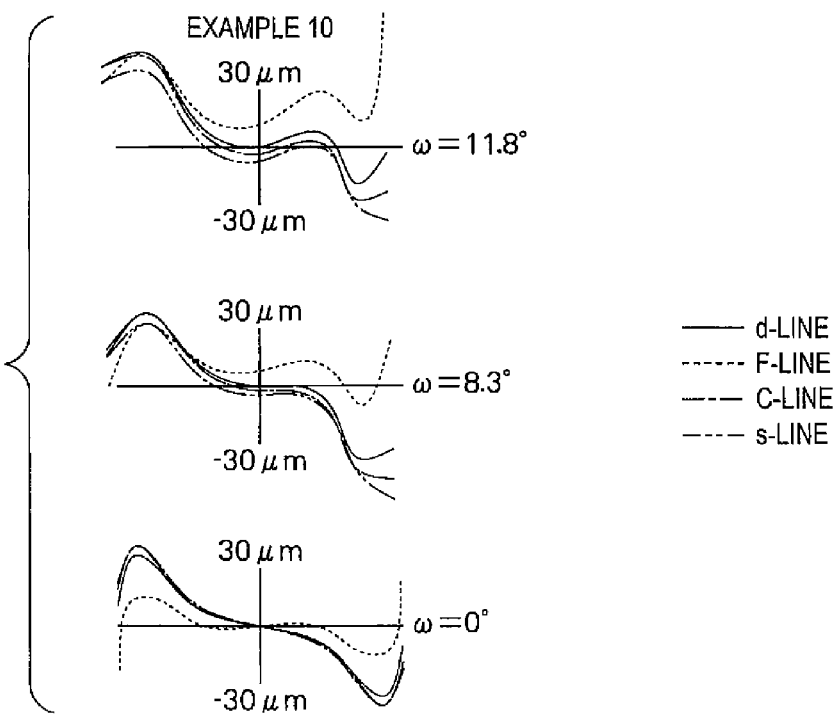
FIG. 41 is a diagram showing comatic aberrations of the imaging lens according to Example 10.
Figure 42:
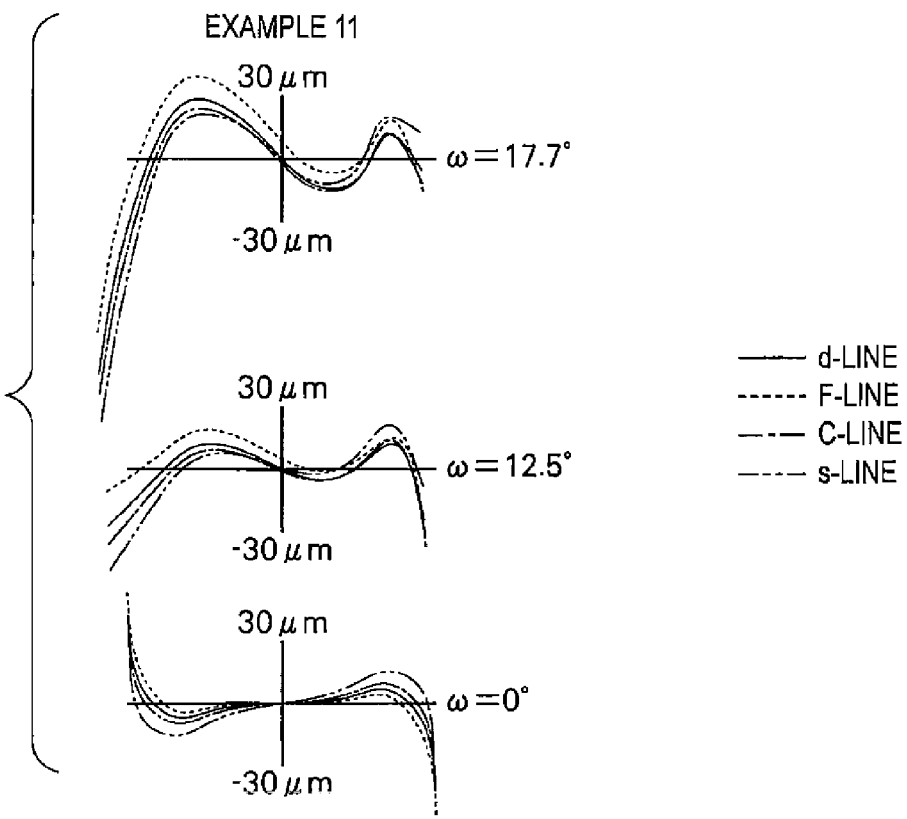
FIG. 42 is a diagram showing comatic aberrations of the imaging lens according to Example 11.
Figure 43:
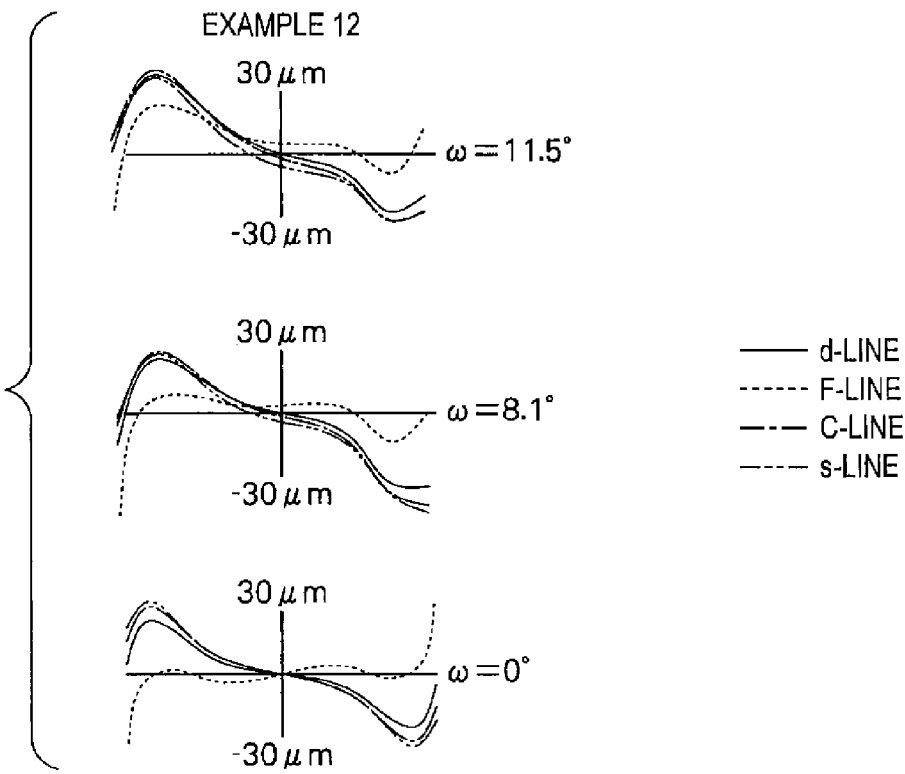
FIG. 43 is a diagram showing comatic aberrations of the imaging lens according to Example 12.
Figure 44:
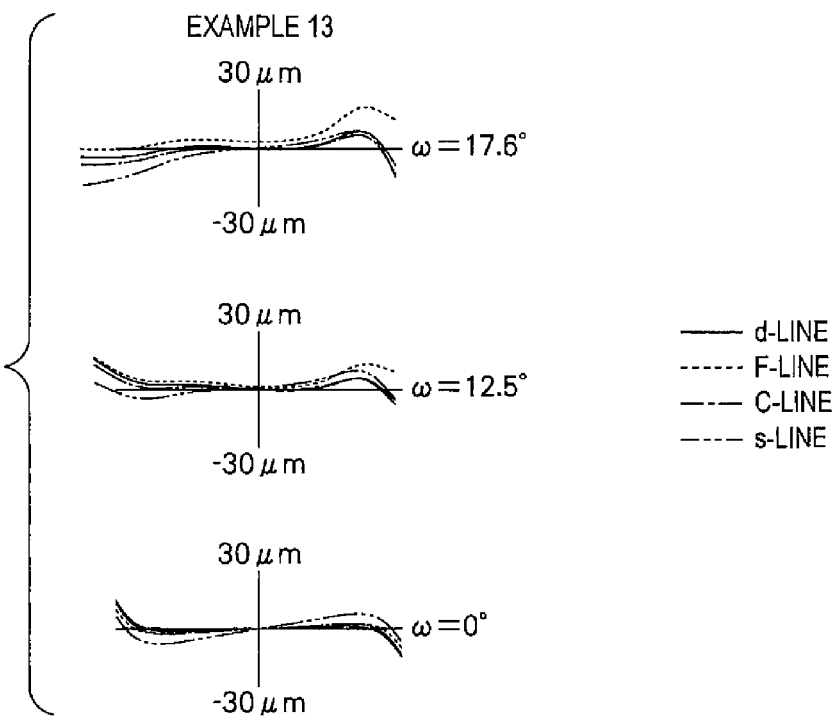
FIG. 44 is a diagram showing comatic aberrations of the imaging lens according to Example 13.
Figure 45:
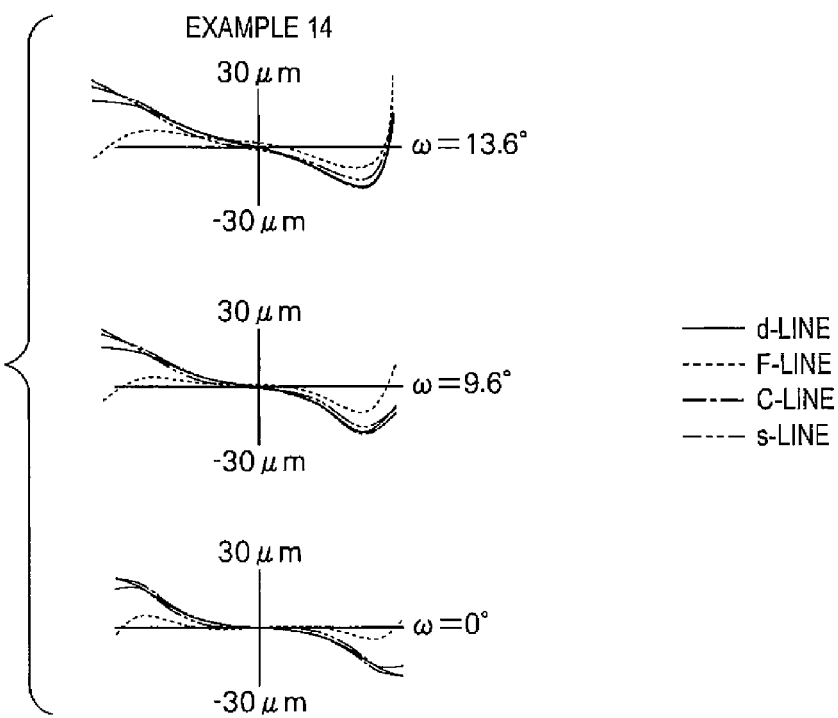
FIG. 45 is a diagram showing comatic aberrations of the imaging lens according to Example 14.
Figure 46:
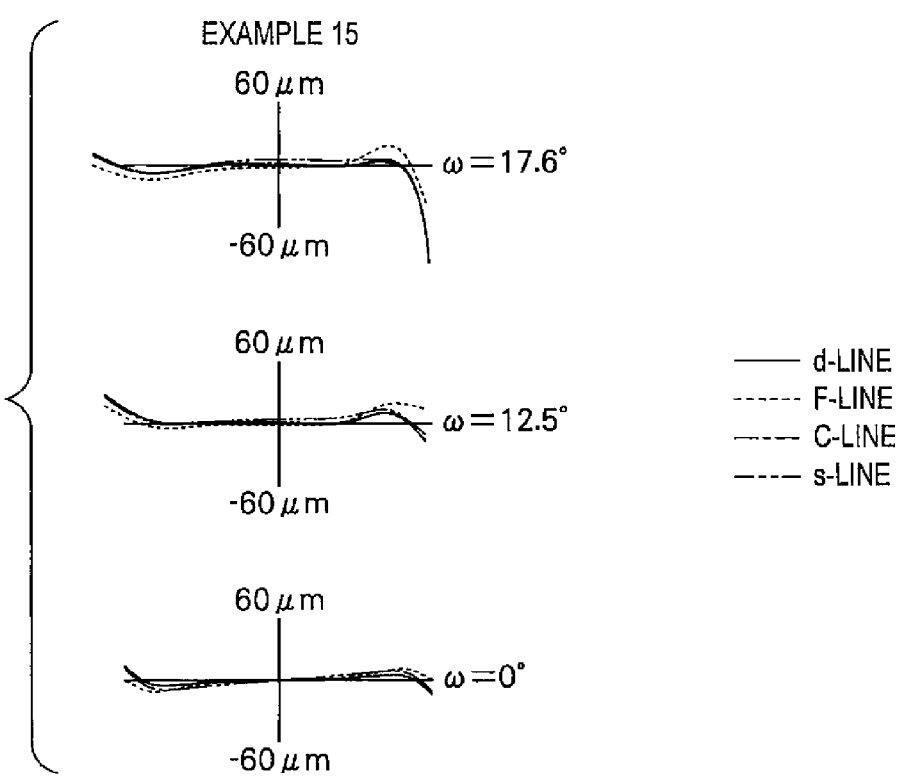
FIG. 46 is a diagram showing comatic aberrations of the imaging lens according to Example 15.

In FIGS. 14 to 16, imaging lenses are configured as four groups having five lenses, and an aperture diaphragm St as a stop is disposed between the first lens group G1 and the second lens group G2. Specifically, each of these imaging lenses include a first lens group G1 of a lens L1, a second lens group G2 of a cemented lens by cementing a lens L21 and a lens L22, a third lens group G3 of a lens L3, and a fourth lens group G4 of a lens L4.

In addition, the aperture diaphragm St shown in FIGS. 1 to 16 does not illustrate a shape and a size thereof, but illustrates a position thereof on the optical axis Z.

In this embodiment, when a distance on the optical axis from a surface closest to the object side in the first lens group G1 to an image plane is L, a distance on the optical axis from a surface closest to an image side in the fourth lens group G4 to the image plane is Bf, and a focal length of the whole system is f, the imaging lens may satisfy the following conditional expressions (1) and (2). Either of the following conditional expressions (1) and (2) may be satisfied, or both of the following conditional expressions (1) and (2) may be satisfied.

$$0.8 < L/f < 1.7 \tag{1}$$

$$0.2 < Bf/f < 0.4 \tag{2}$$

When the upper limit of the conditional expression (1) is exceeded, a length of the whole system increases, and thus it is difficult to achieve downsizing. When the value falls below the lower limit of the conditional expression (1), the length of the whole system becomes too short, and thus it is difficult to perform processing of the lens, or the focal length of the whole system is too long, and so an angle of view thereof becomes too small.

When the upper limit of the conditional expression (2) is exceeded, a back focal length becomes too long, and thus it is difficult to make the length of the whole system small. When the value falls below the lower limit of the conditional expression (2), the back focal length becomes too short, and thus it is difficult to place a filter of various types such as an IR cut filter or a UV cut filter between the lens system and the imaging device.

In this embodiment, when a focal length of the second lens group G2 is $f_2$ and the focal length of the whole system is f, the imaging lens may satisfy the following conditional expression (3).

$$-1.0 < f/f_2 < 1.0 \tag{3}$$

The conditional expression (3) defines an allowable range of the focal length of the second lens group G2. When the upper limit or the lower limit of the conditional expression (3) is exceeded, spherical aberration increases, and thus it is difficult to achieve a fast optical system having a small F number and obtain good image.

In this embodiment, when a radius of curvature of the surface closest to the object side in the second lens group G2 is $R_{2A}$ and a radius of curvature of the surface closest to the image side in the second lens group G2 is $R_{2B}$, the imaging lens may satisfy the following conditional expression (4).

$$0.3 < R_{2A}/R_{2B} < 1.5 \tag{4}$$

When the second lens group G2 is assumed as a single lens, the conditional expression (4) defines an allowable range of the radiuses of curvature of an incident surface and an exit surface thereof. When the upper limit or the lower limit of the conditional expression (4) is exceeded, it is difficult to satisfactorily correct field curvature.

In the imaging lens, the aperture diaphragm St may be disposed closer to the object side than the lens closest to the object side in the second lens group G2. It is configured that the first lens group G1 has a positive power and the aperture diaphragm St is disposed closer to the object side than the lens surface closest to the object side in the second lens group G2, and thus it is possible to position an entrance pupil on the object side while satisfactorily correcting aberration. With such a configuration, a light ray height in a lens close to the object side decreases, and thus it is possible to decrease an effective diameter of the lens. Therefore, it is possible to decrease an exposed area of the lens. For example, when the imaging lens is employed in an onboard camera, it is required to reduce the exposed area of the lens in order not to disfigure an exterior view. Hence, the configuration as mentioned above is advantageous.

The aperture diaphragm St may be disposed between the first lens group G1 and the second lens group G2, or may be disposed closer to the object side than the first lens group G1. When the aperture diaphragm St is disposed between the first lens group G1 and the second lens group G2, it is possible to position the entrance pupil to be close to the object side while satisfactorily correcting comatic aberration. Therefore, the configuration is advantageous in view of performance.

In addition, when the aperture diaphragm St is disposed closer to the object side than the first lens group G1, it is possible to position the entrance pupil to be closer to the object side than the lens system. Hence, it is possible to minimize the exposed area of the lens. Therefore, the configuration is advantageous in view of downsizing. In addition, when the first lens group G1 includes a plurality of lenses, the aperture diaphragm St may be included in the first lens group G1.

In this embodiment, when a distance from a vertex of the surface closest to the object side in the first lens group G1 to an entrance pupil is ENP and the distance on the optical axis from the surface closest to the object side in the first lens group G1 to the image plane is L, the imaging lens may satisfy the following conditional expression (5).

$$ENP/L < 0.5 \qquad (5)$$

By satisfying the conditional expression (5), it is possible to decrease a diameter of the area exposed to the outside in the lens closest to the object side. When the allowable range of the conditional expression (5) is exceeded, the diameter of the area exposed to the outside in the lens closest to the object side increases. Thus, when the image lens is employed in, for example, an onboard camera, there is concern about to disfigure an exterior view of a vehicle.

In this embodiment, when an Abbe number of a lens closest to the object side in a cemented lens, which is included in the fourth lens group G4, at the d-line is $v_{F4}$ and an Abbe number of a lens closest to the image side in the cemented lens at the d-line is $v_{R4}$, the imaging lens may satisfy the following conditional expression (6).

$$v_{F4}/v_{R4} > 1.0 \qquad (6)$$

The conditional expression (6) defines the quality of the material suitable to the cemented lens of the fourth lens group G4. When the allowable range of the conditional expression (6) is exceeded, it is difficult to satisfactorily correct longitudinal chromatic aberration and lateral chromatic aberration.

In this embodiment, when a focal length of the fourth lens group G4 is $f_4$ and the focal length of the whole system is f, the imaging lens may satisfy the following conditional expression (7).

$$-3.0 < f_4/f < -0.5 \qquad (7)$$

The conditional expression (7) defines an allowable range of the focal length of the fourth lens group G4. When the upper limit of the conditional expression (7) is exceeded, it is possible to satisfactorily correct field curvature. However, it is difficult to correct comatic aberration. When the value falls below the lower limit of the conditional expression (7), it is difficult to correct field curvature.

In this embodiment, when a distance on the optical axis from the surface closest to the object side to the surface closest to the image side in the second lens group G2 is $D_2$, the imaging lens may satisfy the following conditional expression (8).

$$3.5 < D_2 < 6.0 \qquad (8)$$

When the upper limit of the conditional expression (8) is exceeded, a size of the second lens group G2 increases, and thus it is difficult to achieve downsizing. When the value is not less than the lower limit of the conditional expression (8), on-axis rays and off-axis rays can be separated from each other. Thus, it is possible to satisfactorily correct field curvature.

In the imaging lens, an effective diameter of the whole lens system may be 15 mm or less. Thereby, it is possible to achieve downsizing the lens system in the diametrical direction. Thus, it is possible to reduce the exposed area of the lens system. In addition, the effective diameter of the whole lens system may be 10 mm or less.

In this embodiment, when a diameter of the exposed area of the lens system is X and the distance on the optical axis from the surface closest to the object side in the first lens group G1 to the image plane is L, the imaging lens may satisfy the following conditional expression (9). Here, in a case where the aperture diaphragm St is disposed closer to the object side than the lens closest to the object side in the whole system, the diameter X of the exposed area of the lens system is defined as a diameter of the aperture diaphragm St. In the other cases, the diameter X is defined as an effective diameter of the lens closest to the object side.

$$X/L \leq 0.5 \qquad (9)$$

By satisfying the conditional expression (9), it is possible to decrease the exposed diameter of the lens system. Thus, when the lens is employed in, for example, an onboard camera, the configuration mentioned above is advantageous in that an exterior view of a vehicle is not disfigured.

In this embodiment, when a focal length of the first lens group G1 is $f_1$ and the focal length of the whole system is f, the imaging lens may satisfy the following conditional expression (10).

$$0.5 < f_1/f < 1.5 \qquad (10)$$

When the upper limit of the conditional expression (10) is exceeded, it is difficult to satisfactorily correct comatic aberration. When the value falls below the lower limit of the conditional expression (10), the back focal length becomes short, and thus it is difficult to correct field curvature.

In this embodiment, when a focal length of the third lens group G3 is $f_3$ and the focal length of the whole system is f, the imaging lens may satisfy the following conditional expression (11).

$$1.0 < f_3/f < 3.5 \qquad (11)$$

When the upper limit of the conditional expression (11) is exceeded, it is difficult to correct comatic aberration. When the value falls below the lower limit of the conditional expression (11), it is difficult to correct field curvature.

In this embodiment, the second lens group G2 may include a cemented lens formed by cementing a positive lens and a negative lens. In this case, when an Abbe number of the positive lens at the d-line is $v_{p2}$ and an Abbe number of the negative lens at the d-line is $v_{n2}$, the imaging lens may satisfy the following conditional expression (12).

$$v_{p2}/v_{n2} > 1.0 \tag{12}$$

When the value falls below the lower limit of the conditional expression (12), it is difficult to satisfactorily correct longitudinal chromatic aberration and lateral chromatic aberration.

In this embodiment, the imaging lens may satisfy the conditional expression (12-2). In this case, it becomes further advantageous in correction of longitudinal chromatic aberration and lateral chromatic aberration.

$$v_{p2}/v_{n2} > 1.4 \tag{12-2}$$

In Examples 1 to 12 to be described later, all lenses were made of glass. Likewise, in the imaging lens, lenses in the whole system may be made of glass, or may be made of transparent ceramic or plastic.

In addition, when the imaging lens is used in severe environment such as onboard camera, a lens disposed closest to the object side may have high resistivity with respect to temperature variance caused by direct light rays and surface deterioration caused by rainstorm. In addition, the lens may be made a material having high resistivity with respect to chemicals such as oils and cleansers, that is, a material having high water resistance, high antiweatherability, high acid resistance, and high chemical resistance.

In addition, as a material of the lens disposed closest to the object side, it is possible to use a material that is hard and is scarcely broken, and specifically, glass or transparent ceramics may be used. The ceramics has properties of higher stiffness than normal glass and high heat resistance.

In addition, when the imaging lens is applied to an onboard camera, it may be required to be available in a wide temperature range from outside air in a cold region to a vehicle inside in summer of a tropical region. When the imaging lens is used in the wide temperature range, it is possible to use lens material having a small linear expansion coefficient.

In addition, in order to manufacture a low-cost lens, all lenses may be spherical lenses. Alternatively, in order to satisfactorily correct aberrations, an aspheric lens may be used. In addition, in order to form aspheric surface with high accuracy and low cost, the lens may be made of plastic.

In addition, there is a concern that light rays passing through out of the effective diameter reach the image plane as stray light and become a ghost image, and thus it is better to shield the stray light by providing light shielding means. Examples of the shielding means may include an opaque coating material and an opaque plate member provided on a portion outside the effective diameter of a lens. Alternatively, the stray light may be shielded by providing an opaque plate member on the optical path of the stray light, as the shielding means. In FIG. 1, there is shown an example in which shielding means 11 is provided on the surface of the lens L42 facing toward the image side.

EXAMPLES

Hereinafter, numerical examples of the imaging lens according to an exemplary embodiment of the invention will be described in detail.

Example 1

Table 1 shows lens data and various data of the imaging lens according to Example 1. In the lens data of Table 1, a surface number represents the sequential number of i-th (i=1, 2, 3 . . . ) surface that sequentially increases as it gets closer to the image side when a surface of a component closest to the object side is defined as a first surface. In addition, in the lens data of Table 1, the aperture diaphragm St and the optical member PP are also noted.

In Table 1, Ri represents a radius of curvature of i-th (i=1, 2, 3 . . . ) surface, and Di represents an on-axis surface spacing on the optical axis Z between the i-th (i=1, 2, 3 . . . ) surface and the (i+1)th surface on the optical. In addition, Ndj represents a refractive index at the d-line in a j-th (j=1, 2, 3 . . . ) optical element of which the sequential number sequentially increases as it gets closer to the image side when a surface of the optical element closest to the object side is defined as a first surface. In addition, vdj represents an Abbe number of the j-th optical element at the d-line. In Table 1, units of the radius of curvature and the on-axis surface spacing are mm. In addition, a direction in which the radius of curvature is convex toward the object side is defined as a positive direction, and a direction in which the radius of curvature is convex toward the image side is defined as a negative direction.

In the various data shown in Table 1, FNo. represents an F number, ω represents a half angle of view, L represents a distance from a vertex of the object side surface of the first lens L1 to the image plane on the optical axis Z (the back focal lenght part is air-converted), Bf represents an air-converted back focal length, and f represents a focal length of the whole system. In addition, $f_1$ represents a focal length of the first lens group G1, $f_2$ represents a focal length of the second lens group G2, $f_3$ represents a focal length of the third lens group G3, and $f_4$ represents a focal length of the fourth lens group G4. In the various data shown in Table 1, a unit of ω is degree, and all units other than the units of FNo. and ω are mm. In addition, the reference signs in Table 1 have the same meaning as the reference signs in examples to be described later.

TABLE 1

Example 1

Lens Data

| SURFACE NUMBER | Ri | Di | Ndj | vdj |
|---|---|---|---|---|
| 1 | 8.66 | 2.80 | 1.8348 | 42.7 |
| 2 | 28.03 | 0.19 | | |
| 3 (APERTURE DIAPHRAGM) | ∞ | 0.61 | | |
| 4 | −9.95 | 1.24 | 1.7174 | 29.5 |
| 5 | 4.26 | 3.40 | 1.8348 | 42.7 |
| 6 | −11.65 | 0.14 | | |
| 7 | 19.26 | 1.70 | 1.8348 | 42.7 |
| 8 | −119.56 | 1.47 | | |
| 9 | −4.43 | 0.91 | 1.6129 | 37.0 |
| 10 | −19.92 | 1.82 | 1.7725 | 49.6 |
| 11 | −10.98 | 2.27 | | |
| 12 | ∞ | 0.90 | 1.5231 | 54.5 |
| 13 | ∞ | 1.00 | | |
| 14 (IMAGE PLANE) | ∞ | | | |

Various Data

| FNo. | 2.0 |
|---|---|
| ω | 17.7 |
| L | 18.1 |
| Bf | 3.87 |
| f | 12.0 |
| $f_1$ | 14.1 |
| $f_2$ | 26.3 |
| $f_3$ | 20.0 |
| $f_4$ | −16.5 |
| ENP | 2.1 |
| X | 6.9 |

Figure 2:
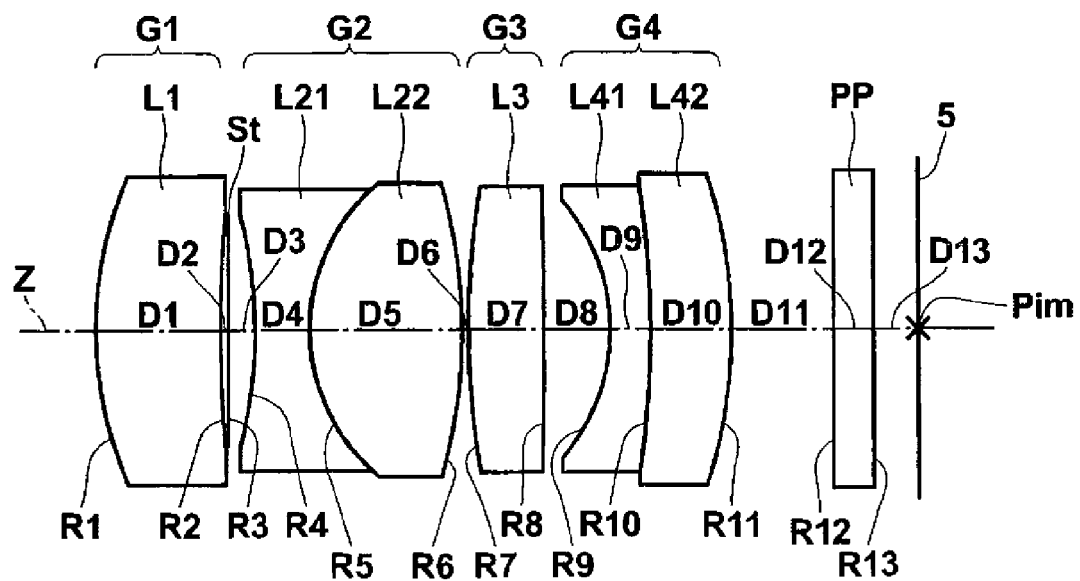
FIG. 2 is a sectional diagram showing a configuration of an imaging lens according to Example 1.

FIG. 2 is a lens configuration diagram illustrating the lens according to Example 1. In FIG. 2, the reference signs Ri and Di (i=1, 2, 3 . . . ) correspond to the Ri and the Di in Table 1. In addition, in the reference signs in FIG. 2, the aperture diaphragm St and the optical member PP are also noted

Example 2

Figure 3:
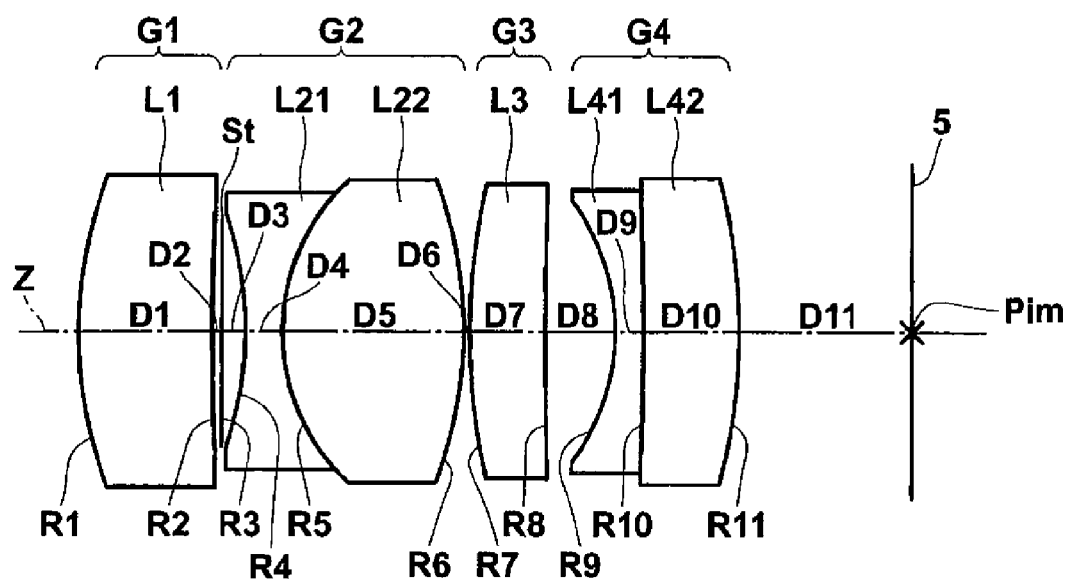
FIG. 3 is a sectional diagram showing a configuration of an imaging lens according to Example 2.

Table 2 shows lens data and various data of the imaging lens according to Example 2. FIG. 3 shows a lens configuration diagram. In FIG. 3, the reference signs Ri and Di correspond to the Ri and the Di in Table 2. In the exemplary configuration according to Example 2 shown in Table 2 and FIG. 3, the optical member PP is not included. However, similarly to the other examples in the lens system according to Example 2, the optical member PP also can be employed to be interleaved between the lens system and the image plane.

TABLE 2

Example 2

Lens Data

| SURFACE NUMBER | Ri | Di | Ndj | νdj |
|---|---|---|---|---|
| 1 | 10.01 | 3.00 | 1.8348 | 42.7 |
| 2 | 52.27 | 0.21 | | |
| 3 (APERTURE DIAPHRAGM) | ∞ | 0.54 | | |
| 4 | −8.10 | 0.85 | 1.7174 | 29.5 |
| 5 | 4.67 | 4.06 | 1.8348 | 42.7 |
| 6 | −9.65 | 0.15 | | |
| 7 | 14.50 | 1.71 | 1.8348 | 42.7 |
| 8 | 106.69 | 1.60 | | |
| 9 | −4.91 | 0.65 | 1.6129 | 37.0 |
| 10 | −78.58 | 2.15 | 1.62041 | 60.3 |
| 11 | −13.65 | 3.88 | | |
| 12 (IMAGE PLANE) | ∞ | | | |

Various Data

| FNo. | 2.0 |
|---|---|
| ω | 17.6 |
| L | 18.8 |
| Bf | 3.88 |
| f | 12.0 |
| $f_1$ | 14.4 |
| $f_2$ | 25.1 |
| $f_3$ | 19.9 |
| $f_4$ | −14.4 |
| ENP | 2.2 |
| X | 7.0 |

Example 3

Figure 4:
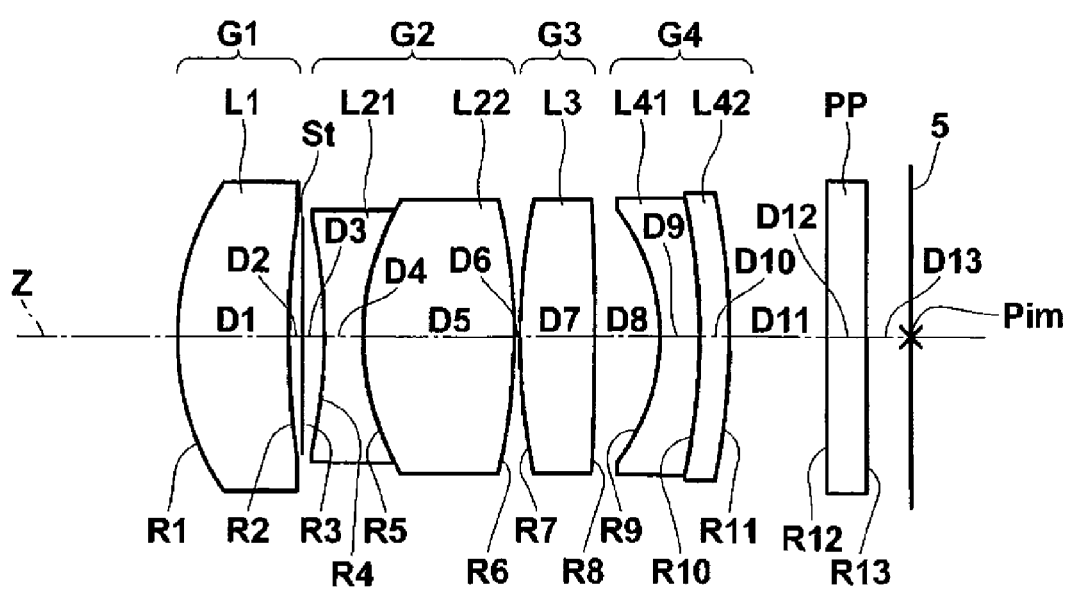
FIG. 4 is a sectional diagram showing a configuration of an imaging lens according to Example 3.

Table 3 shows lens data and various data of the imaging lens according to Example 3. FIG. 4 shows a lens configuration diagram. In FIG. 4, the reference signs Ri and Di correspond to the Ri and the Di in Table 3.

TABLE 3

Example 3

Lens Data

| SURFACE NUMBER | Ri | Di | Ndj | νdj |
|---|---|---|---|---|
| 1 | 6.20 | 2.54 | 1.7130 | 53.9 |
| 2 | 20.00 | 0.30 | | |
| 3 (APERTURE DIAPHRAGM) | ∞ | 0.50 | | |
| 4 | −12.19 | 0.88 | 1.7174 | 29.5 |
| 5 | 6.02 | 3.40 | 1.7130 | 53.9 |
| 6 | −12.97 | 0.14 | | |
| 7 | 15.96 | 1.70 | 1.8348 | 42.7 |
| 8 | −56.16 | 1.46 | | |

TABLE 3-continued

Example 3

| 9 | −4.67 | 0.91 | 1.6129 | 37 |
|---|---|---|---|---|
| 10 | −14.47 | 0.66 | 1.5168 | 64.2 |
| 11 | −16.29 | 2.16 | | |
| 12 | ∞ | 0.90 | 1.5168 | 64.2 |
| 13 | ∞ | 1.00 | | |
| 14 (IMAGE PLANE) | ∞ | | | |

Various Data

| FNo. | 2.0 |
|---|---|
| ω | 17.0 |
| L | 16.2 |
| Bf | 3.76 |
| f | 12.3 |
| $f_1$ | 11.7 |
| $f_2$ | 283.8 |
| $f_3$ | 17.2 |
| $f_4$ | −11.3 |
| ENP | 2.2 |
| X | 6.9 |

Example 4

Figure 5:
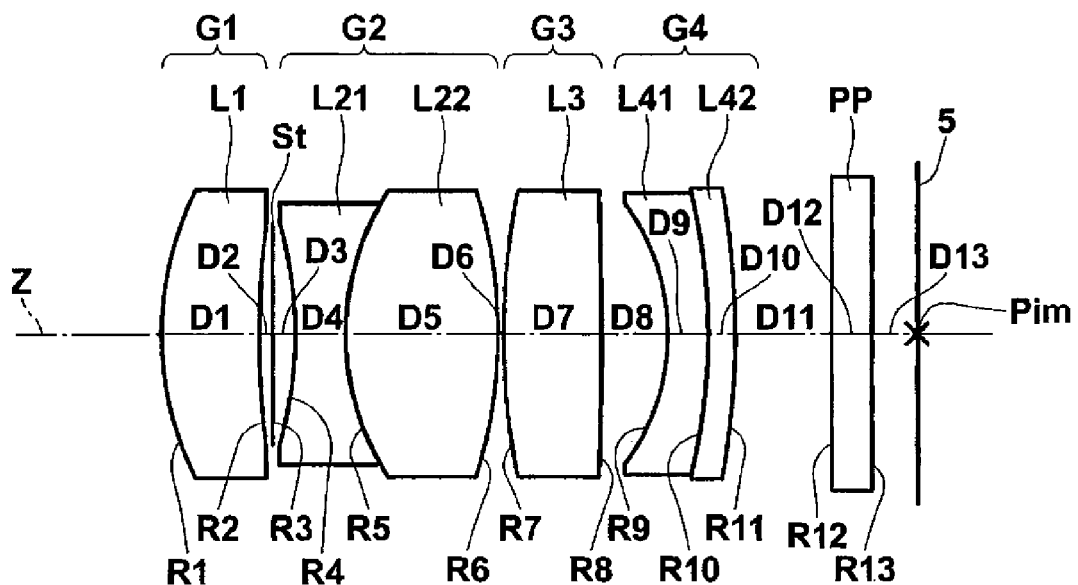
FIG. 5 is a sectional diagram showing a configuration of an imaging lens according to Example 4.

Table 4 shows lens data and various data of the imaging lens according to Example 4. FIG. 5 shows a lens configuration diagram. In FIG. 5, the reference signs Ri and Di correspond to the Ri and the Di in Table 4.

TABLE 4

Example 4

Lens Data

| SURFACE NUMBER | Ri | Di | Ndj | νdj |
|---|---|---|---|---|
| 1 | 7.18 | 2.19 | 1.7550 | 52.3 |
| 2 | 21.02 | 0.30 | | |
| 3 (APERTURE DIAPHRAGM) | ∞ | 0.50 | | |
| 4 | −9.22 | 1.13 | 1.7174 | 29.5 |
| 5 | 5.89 | 3.40 | 1.8348 | 42.7 |
| 6 | −10.96 | 0.13 | | |
| 7 | 16.51 | 2.19 | 1.8348 | 42.7 |
| 8 | −95.85 | 1.49 | | |
| 9 | −4.86 | 0.91 | 1.6129 | 37 |
| 10 | −12.93 | 0.59 | 1.5168 | 64.2 |
| 11 | −17.73 | 2.18 | | |
| 12 | ∞ | 0.90 | 1.5168 | 64.2 |
| 13 | ∞ | 1.00 | | |
| 14 (IMAGE PLANE) | ∞ | | | |

Various Data

| FNo. | 2.0 |
|---|---|
| ω | 18.6 |
| L | 16.6 |
| Bf | 3.78 |
| f | 11.3 |
| $f_1$ | 13.5 |
| $f_2$ | 32.0 |
| $f_3$ | 17.0 |
| $f_4$ | −11.7 |
| ENP | 1.8 |
| X | 6.4 |

Example 5

Figure 6:
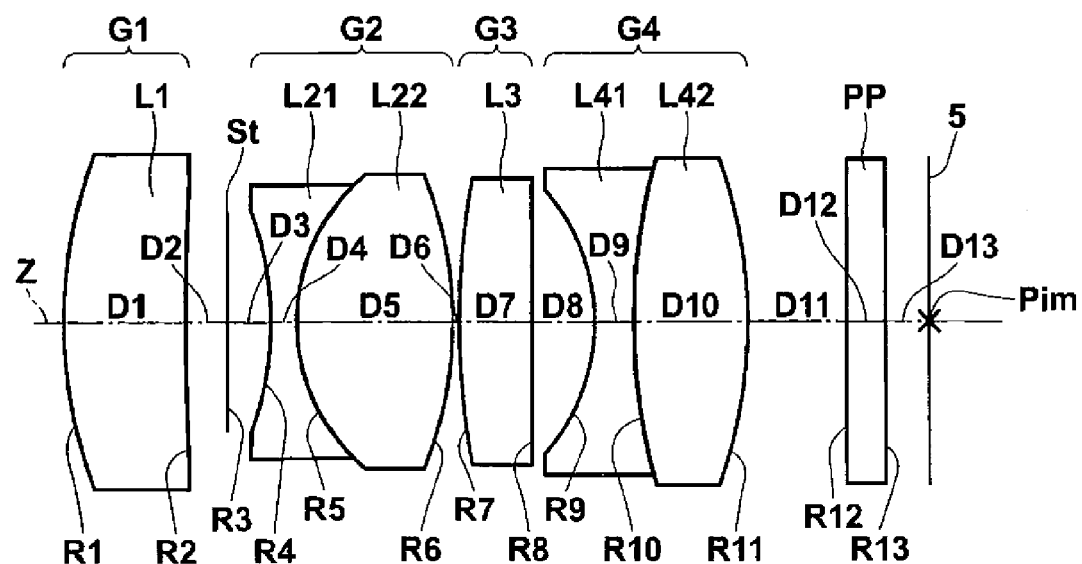
FIG. 6 is a sectional diagram showing a configuration of an imaging lens according to Example 5.

Table 5 shows lens data and various data of the imaging lens according to Example 5. FIG. 6 shows a lens configuration diagram. In FIG. 6, the reference signs Ri and Di correspond to the Ri and the Di in Table 5.

TABLE 5

Example 5

Lens Data

| SURFACE NUMBER | Ri | Di | Ndj | vdj |
|---|---|---|---|---|
| 1 | 11.03 | 2.85 | 1.8348 | 42.7 |
| 2 | 66.25 | 0.99 | | |
| 3 (APERTURE DIAPHRAGM) | ∞ | 1.00 | | |
| 4 | −7.50 | 0.60 | 1.7174 | 29.5 |
| 5 | 4.46 | 3.63 | 1.8348 | 42.7 |
| 6 | −8.99 | 0.15 | | |
| 7 | 17.59 | 1.70 | 1.8348 | 42.7 |
| 8 | ∞ | 1.46 | | |
| 9 | −4.64 | 0.91 | 1.6129 | 37.0 |
| 10 | 14.03 | 2.66 | 1.7725 | 49.6 |
| 11 | −10.98 | 2.32 | | |
| 12 | ∞ | 0.90 | 1.5231 | 54.5 |
| 13 | ∞ | 1.00 | | |
| 14 (IMAGE PLANE) | ∞ | | | |

Various Data

| | |
|---|---|
| FNo. | 2.0 |
| ω | 17.7 |
| L | 19.9 |
| Bf | 3.91 |
| f | 12.0 |
| $f_1$ | 15.5 |
| $f_2$ | 24.8 |
| $f_3$ | 21.1 |
| $f_4$ | −31.6 |
| ENP | 3.1 |
| X | 7.8 |

Example 6

Figure 7:
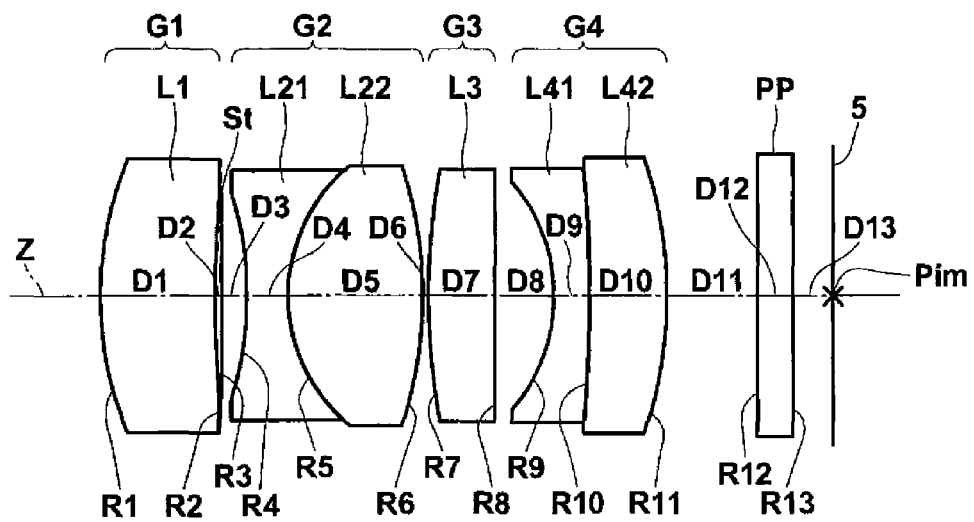
FIG. 7 is a sectional diagram showing a configuration of an imaging lens according to Example 6.

Table 6 shows lens data and various data of the imaging lens according to Example 6. FIG. 7 shows a lens configuration diagram. In FIG. 7, the reference signs Ri and Di correspond to the Ri and the Di in Table 6.

TABLE 6

Example 6

Lens Data

| SURFACE NUMBER | Ri | Di | Ndj | vdj |
|---|---|---|---|---|
| 1 | 8.99 | 2.92 | 1.8348 | 42.7 |
| 2 | 32.56 | 0.16 | | |
| 3 (APERTURE DIAPHRAGM) | ∞ | 0.64 | | |
| 4 | −8.93 | 1.04 | 1.7174 | 29.5 |
| 5 | 4.26 | 3.40 | 1.8348 | 42.7 |
| 6 | −10.60 | 0.14 | | |
| 7 | 17.38 | 1.70 | 1.8348 | 42.7 |
| 8 | ∞ | 1.53 | | |
| 9 | −4.37 | 0.91 | 1.6129 | 37.0 |
| 10 | −36.64 | 1.94 | 1.7725 | 49.6 |
| 11 | −10.98 | 2.31 | | |
| 12 | ∞ | 0.90 | 1.5231 | 54.5 |
| 13 | ∞ | 1.00 | | |
| 14 (IMAGE PLANE) | ∞ | | | |

Various Data

| | |
|---|---|
| FNo. | 2.0 |
| ω | 17.7 |
| L | 18.3 |
| Bf | 3.90 |
| f | 12.0 |
| $f_1$ | 14.0 |
| $f_2$ | 25.8 |
| $f_3$ | 20.8 |

TABLE 6-continued

Example 6

| | |
|---|---|
| $f_4$ | −17.3 |
| ENP | 4.1 |
| X | 6.9 |

Example 7

Figure 8:
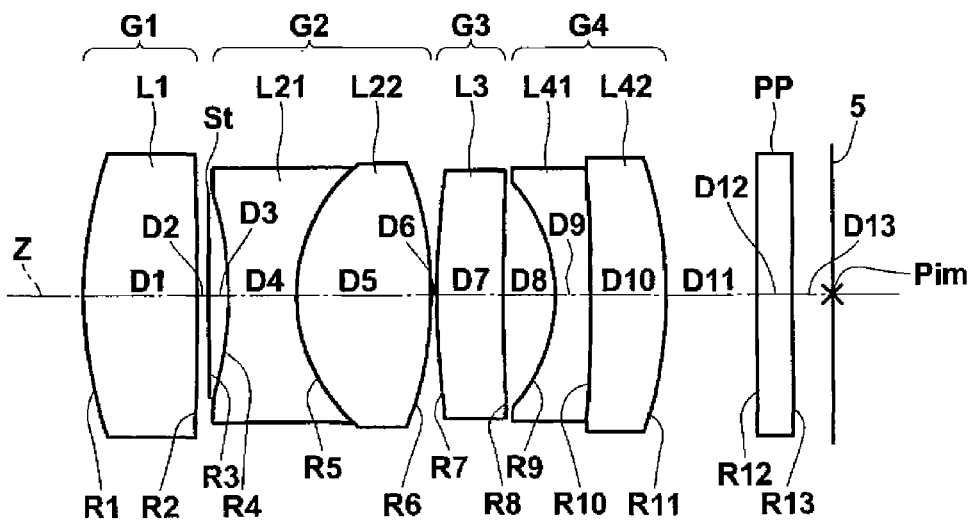
FIG. 8 is a sectional diagram showing a configuration of an imaging lens according to Example 7.

Table 7 shows lens data and various data of the imaging lens according to Example 7. FIG. 8 shows a lens configuration diagram. In FIG. 8, the reference signs Ri and Di correspond to the Ri and the Di in Table 7.

TABLE 7

Example 7

Lens Data

| SURFACE NUMBER | Ri | Di | Ndj | vdj |
|---|---|---|---|---|
| 1 | 10.65 | 2.89 | 1.8348 | 42.7 |
| 2 | −121.87 | 0.30 | | |
| 3 (APERTURE DIAPHRAGM) | ∞ | 0.50 | | |
| 4 | −8.52 | 1.71 | 1.7174 | 29.5 |
| 5 | 4.29 | 3.40 | 1.8348 | 42.7 |
| 6 | −9.20 | 0.14 | | |
| 7 | 22.58 | 1.70 | 1.8348 | 42.7 |
| 8 | 78.35 | 1.32 | | |
| 9 | −4.24 | 0.91 | 1.6129 | 37.0 |
| 10 | −47.65 | 1.88 | 1.7725 | 49.6 |
| 11 | −10.98 | 2.29 | | |
| 12 | ∞ | 0.90 | 1.5231 | 54.5 |
| 13 | ∞ | 1.00 | | |
| 14 (IMAGE PLANE) | ∞ | | | |

Various Data

| | |
|---|---|
| FNo. | 2.0 |
| ω | 17.7 |
| L | 18.6 |
| Bf | 3.88 |
| f | 12.0 |
| $f_1$ | 11.8 |
| $f_2$ | 18.9 |
| $f_3$ | 37.5 |
| $f_4$ | −16.4 |
| ENP | 4.2 |
| X | 7.1 |

Example 8

Figure 9:
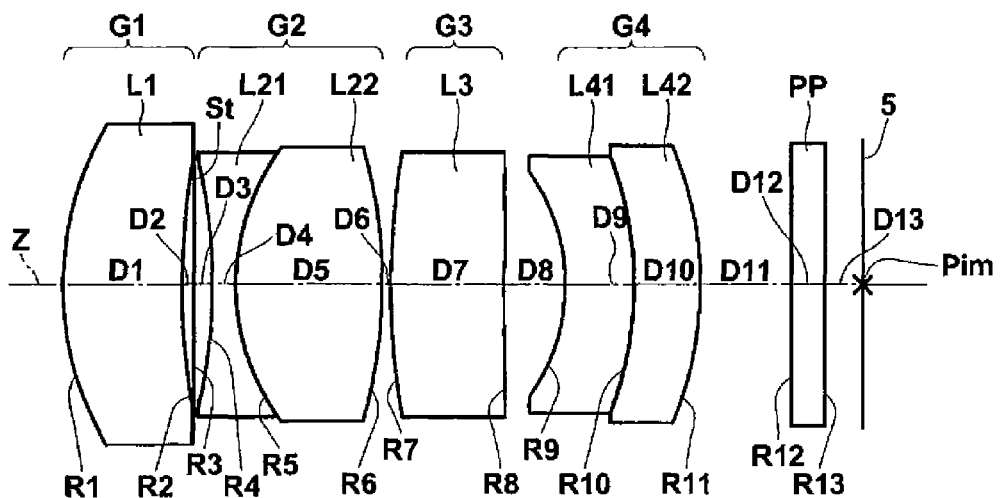
FIG. 9 is a sectional diagram showing a configuration of an imaging lens according to Example 8.

Table 8 shows lens data and various data of the imaging lens according to Example 8. FIG. 9 shows a lens configuration diagram. In FIG. 9, the reference signs Ri and Di correspond to the Ri and the Di in Table 8.

TABLE 8

Example 8

Lens Data

| SURFACE NUMBER | Ri | Di | Ndj | vdj |
|---|---|---|---|---|
| 1 | 8.20 | 3.16 | 1.8340 | 37.2 |
| 2 | 19.38 | 0.30 | | |
| 3 (APERTURE DIAPHRAGM) | ∞ | 0.50 | | |
| 4 | −13.91 | 0.61 | 1.6727 | 32.1 |
| 5 | 6.09 | 3.87 | 1.7130 | 53.9 |
| 6 | −13.01 | 0.23 | | |

TABLE 8-continued

Example 8

| | | | | |
|---|---|---|---|---|
| 7 | 20.77 | 3.00 | 1.8348 | 42.7 |
| 8 | 341.18 | 1.62 | | |
| 9 | −5.07 | 1.81 | 1.8467 | 23.8 |
| 10 | −9.62 | 1.76 | 1.5168 | 64.2 |
| 11 | −9.26 | 2.38 | | |
| 12 | ∞ | 0.90 | 1.5168 | 64.2 |
| 13 | ∞ | 1.00 | | |
| 14 (IMAGE PLANE) | ∞ | | | |

Various Data

| | |
|---|---|
| FNo. | 2.0 |
| ω | 13.5 |
| L | 20.9 |
| Bf | 3.98 |
| f | 15.7 |
| $f_1$ | 11.8 |
| $f_2$ | 51.8 |
| $f_3$ | 26.4 |
| $f_4$ | −18.6 |
| ENP | 2.5 |
| X | 8.4 |

Example 9

Table 9 shows lens data and various data of the imaging lens according to Example 9. FIG. 10 shows a lens configuration diagram. In FIG. 10, the reference signs Ri and Di correspond to the Ri and the Di in Table 9.

TABLE 9

Example 9

Lens Data

| SURFACE NUMBER | Ri | Di | Ndj | vdj |
|---|---|---|---|---|
| 1 (APERTURE DIAPHRAGM) | ∞ | 0.00 | | |
| 2 | 7.26 | 2.79 | 1.8348 | 42.7 |
| 3 | 30.67 | 0.80 | | |
| 4 | −13.13 | 2.36 | 1.8830 | 40.8 |
| 5 | −6.40 | 2.00 | 1.9229 | 18.9 |
| 6 | −11.65 | 0.14 | | |
| 7 | 19.26 | 2.63 | 1.8348 | 42.7 |
| 8 | −124.62 | 1.31 | | |
| 9 | −4.76 | 0.91 | 1.8467 | 23.8 |
| 10 | −19.92 | 1.38 | 1.7725 | 49.6 |
| 11 | −10.98 | 1.28 | | |
| 12 | ∞ | 0.90 | 1.5231 | 54.5 |
| 13 | ∞ | 1.00 | | |
| 14 (IMAGE PLANE) | ∞ | | | |

Various Data

| | |
|---|---|
| FNo. | 2.0 |
| ω | 17.1 |
| L | 17.2 |
| Bf | 2.87 |
| f | 12.2 |
| $f_1$ | 10.8 |
| $f_2$ | 55.6 |
| $f_3$ | 20.1 |
| $f_4$ | −11.4 |
| ENP | 0.0 |
| X | 6.1 |

Example 10

Table 10 shows lens data and various data of the imaging lens according to Example 10. FIG. 11 shows a lens configuration diagram. In FIG. 11, the reference signs Ri and Di correspond to the Ri and the Di in Table 10.

TABLE 10

Example 10

Lens Data

| SURFACE NUMBER | Ri | Di | Ndj | vdj |
|---|---|---|---|---|
| 1 (APERTURE DIAPHRAGM) | ∞ | 0.00 | | |
| 2 | 7.05 | 4.51 | 1.5168 | 64.2 |
| 3 | −53.85 | 0.81 | | |
| 4 | −13.25 | 4.09 | 1.9229 | 18.9 |
| 5 | −27.13 | 0.50 | | |
| 6 | 17.37 | 3.00 | 1.7130 | 53.9 |
| 7 | −57.00 | 2.54 | | |
| 8 | −5.06 | 0.91 | 1.9229 | 18.9 |
| 9 | −10.10 | 1.74 | 1.8830 | 40.8 |
| 10 | −10.05 | 2.37 | | |
| 11 | ∞ | 0.90 | 1.5231 | 54.5 |
| 12 | ∞ | 1.00 | | |
| 13 (IMAGE PLANE) | ∞ | | | |

Various Data

| | |
|---|---|
| FNo. | 2.0 |
| ω | 11.8 |
| L | 22.1 |
| Bf | 3.96 |
| f | 17.9 |
| $f_1$ | 12.4 |
| $f_2$ | −32.7 |
| $f_3$ | 19.0 |
| $f_4$ | −14.7 |
| ENP | 0.0 |
| X | 8.9 |

Example 11

Figure 12:
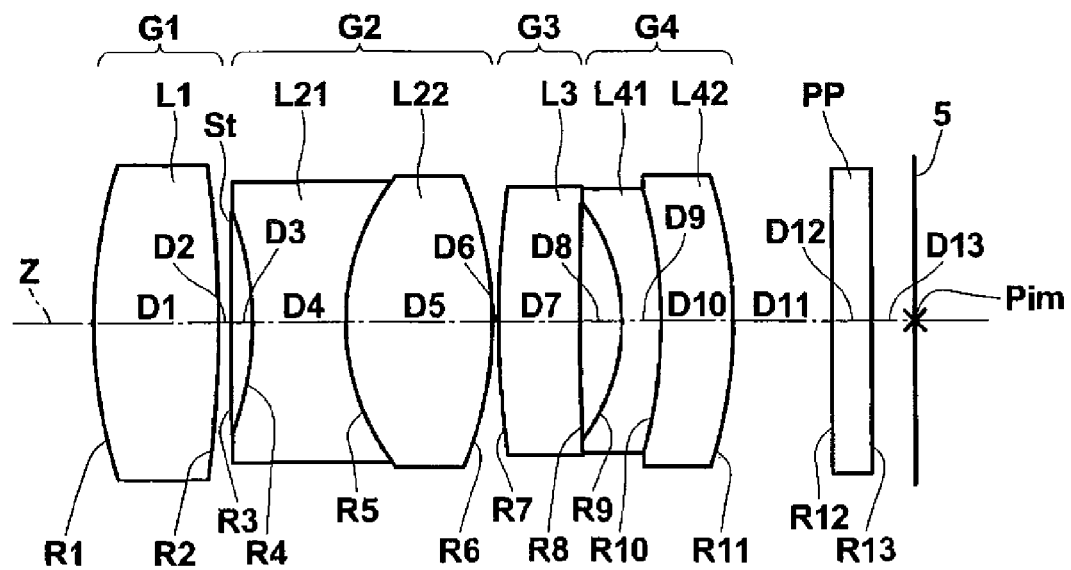
FIG. 12 is a sectional diagram showing a configuration of an imaging lens according to Example 11.

Table 11 shows lens data and various data of the imaging lens according to Example 11. FIG. 12 shows a lens configuration diagram. In FIG. 12, the reference signs Ri and Di correspond to the Ri and the Di in Table 11.

TABLE 11

Example 11

Lens Data

| SURFACE NUMBER | Ri | Di | Ndj | vdj |
|---|---|---|---|---|
| 1 | 11.68 | 2.90 | 1.7550 | 52.3 |
| 2 | −27.45 | 0.30 | | |
| 3 (APERTURE DIAPHRAGM) | ∞ | 0.50 | | |
| 4 | −7.23 | 2.15 | 1.6200 | 36.3 |
| 5 | 5.45 | 3.40 | 1.8348 | 42.7 |
| 6 | −8.55 | 0.14 | | |
| 7 | 22.45 | 1.89 | 1.8348 | 42.7 |
| 8 | 71.46 | 0.98 | | |
| 9 | −4.56 | 0.91 | 1.9229 | 18.9 |
| 10 | −11.46 | 1.67 | 1.8830 | 40.8 |
| 11 | −10.98 | 2.27 | | |
| 12 | ∞ | 0.90 | 1.5231 | 54.5 |
| 13 | ∞ | 1.00 | | |
| 14 (IMAGE PLANE) | ∞ | | | |

Various Data

| | |
|---|---|
| FNo. | 2.0 |
| ω | 17.7 |
| L | 18.7 |
| Bf | 3.86 |
| f | 11.9 |
| $f_1$ | 11.2 |

TABLE 11-continued

| Example 11 | |
|---|---|
| $f_2$ | 13.4 |
| $f_3$ | 38.5 |
| $f_4$ | −10.4 |
| ENP | 2.2 |
| X | 7.2 |

Example 12

Figure 13:
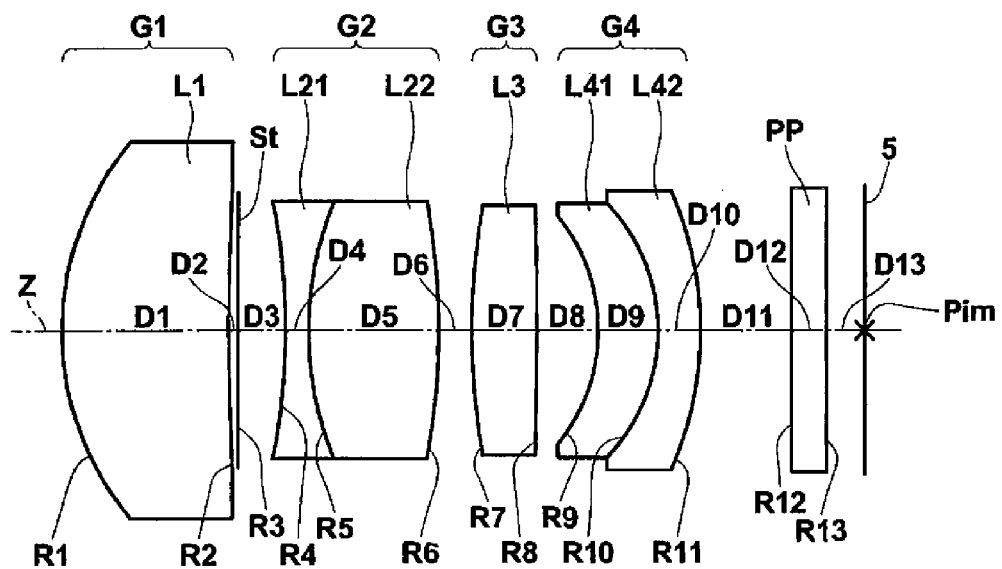
FIG. 13 is a sectional diagram showing a configuration of an imaging lens according to Example 12.

Table 12 shows lens data and various data of the imaging lens according to Example 12. FIG. 13 shows a lens configuration diagram. In FIG. 13, the reference signs Ri and Di correspond to the Ri and the Di in Table 12.

TABLE 12

Example 12

Lens Data

| SURFACE NUMBER | Ri | Di | Ndj | νdj |
|---|---|---|---|---|
| 1 | 7.68 | 4.35 | 1.7550 | 52.3 |
| 2 | 66.97 | 0.25 | | |
| 3 (APERTURE DIAPHRAGM) | ∞ | 1.25 | | |
| 4 | −17.00 | 0.61 | 1.8467 | 23.8 |
| 5 | 8.88 | 3.40 | 1.5831 | 59.4 |
| 6 | −18.77 | 0.86 | | |
| 7 | 18.21 | 1.72 | 1.7550 | 52.3 |
| 8 | −120.68 | 1.61 | | |
| 9 | −4.71 | 1.58 | 1.9229 | 18.9 |
| 10 | −4.77 | 1.11 | 1.7130 | 53.9 |
| 11 | −9.08 | 2.38 | | |
| 12 | ∞ | 0.90 | 1.5168 | 64.2 |
| 13 | ∞ | 1.00 | | |
| 14 (IMAGE PLANE) | ∞ | | | |

Various Data

| FNo. | 2.0 |
|---|---|
| ω | 11.5 |
| L | 20.7 |
| Bf | 3.97 |
| f | 18.3 |
| $f_1$ | 11.1 |
| $f_2$ | −23.2 |
| $f_3$ | 21.1 |
| $f_4$ | −21.5 |
| ENP | 3.7 |
| X | 9.9 |

Example 13

Table 13 shows lens data and various data of the imaging lens according to Example 13. FIG. 14 shows a lens configuration diagram. In FIG. 14, the reference signs Ri and Di correspond to the Ri and the Di in Table 13.

TABLE 13

Example 13

Lens Data

| SURFACE NUMBER | Ri | Di | Ndj | νdj |
|---|---|---|---|---|
| 1 | 10.47 | 3.31 | 1.8348 | 42.7 |
| 2 | 53.23 | 0.53 | | |
| 3 (APERTURE DIAPHRAGM) | ∞ | 0.68 | | |
| 4 | −8.21 | 1.25 | 1.7174 | 29.5 |

TABLE 13-continued

Example 13

| 5 | 5.35 | 4.11 | 1.8348 | 42.7 |
|---|---|---|---|---|
| 6 | −10.16 | 0.15 | | |
| 7 | 14.85 | 2.00 | 1.8348 | 42.7 |
| 8 | −40.08 | 1.24 | | |
| 9 | −6.38 | 1.92 | 1.7215 | 29.2 |
| 10 | −81.23 | 2.53 | | |
| 11 | ∞ | 1.00 | 1.5168 | 64.2 |
| 12 | ∞ | 1.00 | | |
| 13 (IMAGE PLANE) | ∞ | | | |

Various Data

| FNo. | 2.0 |
|---|---|
| ω | 17.6 |
| L | 19.7 |
| Bf | 4.19 |
| f | 12.0 |
| $f_1$ | 15.1 |
| $f_2$ | 28.4 |
| $f_3$ | 13.2 |
| $f_4$ | −9.7 |
| ENP | 2.9 |
| X | 7.5 |

Example 14

Table 14 shows lens data and various data of the imaging lens according to Example 14. FIG. 15 shows a lens configuration diagram. In FIG. 15, the reference signs Ri and Di correspond to the Ri and the Di in Table 14.

TABLE 14

Example 14

Lens Data

| SURFACE NUMBER | Ri | Di | Ndj | νdj |
|---|---|---|---|---|
| 1 | 7.51 | 3.55 | 1.7550 | 52.3 |
| 2 | 20.10 | 0.36 | | |
| 3 (APERTURE DIAPHRAGM) | ∞ | 0.50 | | |
| 4 | −15.36 | 0.61 | 1.8467 | 23.8 |
| 5 | 13.00 | 3.40 | 1.8348 | 42.7 |
| 6 | −15.61 | 0.15 | | |
| 7 | 19.84 | 3.00 | 1.7550 | 52.3 |
| 8 | 399.17 | 1.99 | | |
| 9 | −4.59 | 2.34 | 1.5814 | 40.7 |
| 10 | −9.03 | 2.42 | | |
| 11 | ∞ | 0.90 | 1.5168 | 64.2 |
| 12 | ∞ | 1.00 | | |
| 13 (IMAGE PLANE) | ∞ | | | |

Various Data

| FNo. | 2.0 |
|---|---|
| ω | 13.6 |
| L | 20.2 |
| Bf | 4.01 |
| f | 15.5 |
| $f_1$ | 14.2 |
| $f_2$ | 252.9 |
| $f_3$ | 27.6 |
| $f_4$ | −19.9 |
| ENP | 3.1 |
| X | 8.5 |

Example 15

Table 15 shows lens data and various data of the imaging lens according to Example 15. FIG. 16 shows a lens configuration diagram. In FIG. 16, the reference signs Ri and Di correspond to the Ri and the Di in Table 15.

TABLE 15

Example 15

Lens Data

| SURFACE NUMBER | Ri | Di | Ndj | νdj |
|---|---|---|---|---|
| 1 | 8.67 | 2.72 | 1.8348 | 42.7 |
| 2 | 29.32 | 0.30 | | |
| 3 (APERTURE DIAPHRAGM) | ∞ | 0.50 | | |
| 4 | −10.05 | 1.48 | 1.7174 | 29.5 |
| 5 | 4.15 | 3.40 | 1.8348 | 42.7 |
| 6 | −11.65 | 0.14 | | |
| 7 | 19.26 | 1.70 | 1.8348 | 42.7 |
| 8 | −96.81 | 1.34 | | |
| 9 | −4.46 | 2.65 | 1.6129 | 37.0 |
| 10 | −10.98 | 2.28 | | |
| 11 | ∞ | 0.90 | 1.5168 | 64.2 |
| 12 | ∞ | 1.00 | | |
| 13 (IMAGE PLANE) | ∞ | | | |

Various Data

| | |
|---|---|
| FNo. | 2.0 |
| ω | 17.6 |
| L | 18.4 |
| Bf | 3.87 |
| f | 12.0 |
| $f_1$ | 14.2 |
| $f_2$ | 24.8 |
| $f_3$ | 19.4 |
| $f_4$ | −14.5 |
| ENP | 2.1 |
| X | 7.0 |

In the imaging lens according to Examples 1 to 15 mentioned above, Table 16 and 17 show values corresponding to the conditional expressions (1) to (12). As known from these tables, the imaging lenses according to Examples 1 to 15 satisfy all of the conditional expressions (1) to (12).

TABLE 16

CONDITIONAL EXPRESSION

| | (1) L/f | (2) Bf/f | (3) f/$f_2$ | (4) $R_{2A}/R_{2B}$ | (5) ENP/L | (6) $ν_{F4}/ν_{R4}$ |
|---|---|---|---|---|---|---|
| EXAMPLE 1 | 1.51 | 0.32 | 0.46 | 0.85 | 0.11 | 1.34 |
| EXAMPLE 2 | 1.56 | 0.32 | 0.48 | 0.84 | 0.12 | 1.63 |
| EXAMPLE 3 | 1.32 | 0.31 | 0.04 | 0.94 | 0.14 | 1.74 |
| EXAMPLE 4 | 1.46 | 0.33 | 0.35 | 0.84 | 0.11 | 1.74 |
| EXAMPLE 5 | 1.65 | 0.32 | 0.48 | 0.83 | 0.16 | 1.34 |
| EXAMPLE 6 | 1.52 | 0.32 | 0.46 | 0.84 | 0.22 | 1.34 |
| EXAMPLE 7 | 1.56 | 0.32 | 0.63 | 0.93 | 0.22 | 1.34 |
| EXAMPLE 8 | 1.33 | 0.25 | 0.30 | 1.07 | 0.12 | 2.70 |
| EXAMPLE 9 | 1.41 | 0.24 | 0.22 | 1.13 | 0.00 | 2.08 |
| EXAMPLE 10 | 1.23 | 0.22 | −0.55 | 0.76 | 0.00 | 2.16 |
| EXAMPLE 11 | 1.57 | 0.32 | 0.89 | 0.85 | 0.12 | 2.16 |
| EXAMPLE 12 | 1.13 | 0.22 | −0.79 | 0.91 | 0.18 | 2.85 |
| EXAMPLE 13 | 1.62 | 0.35 | 0.42 | 0.81 | 0.15 | — |
| EXAMPLE 14 | 1.28 | 0.26 | 0.06 | 0.98 | 0.15 | — |
| EXAMPLE 15 | 1.51 | 0.32 | 0.48 | 0.86 | 0.12 | — |

TABLE 17

CONDITIONAL EXPRESSION

| | (7) $f_4/f$ | (8) $D_2$ | (9) X/L | (10) $f_1/f$ | (11) $f_3/f$ | (12) $ν_{p2}/ν_{n2}$ |
|---|---|---|---|---|---|---|
| EXAMPLE 1 | −1.38 | 4.64 | 0.38 | 1.17 | 1.67 | 1.45 |
| EXAMPLE 2 | −1.20 | 4.91 | 0.37 | 1.20 | 1.66 | 1.45 |
| EXAMPLE 3 | −0.92 | 4.28 | 0.42 | 0.95 | 1.39 | 1.83 |
| EXAMPLE 4 | −1.03 | 4.53 | 0.38 | 1.19 | 1.50 | 1.45 |
| EXAMPLE 5 | −2.62 | 4.23 | 0.38 | 1.29 | 1.75 | 1.45 |
| EXAMPLE 6 | −1.44 | 4.44 | 0.37 | 1.17 | 1.73 | 1.45 |
| EXAMPLE 7 | −1.37 | 5.11 | 0.38 | 0.99 | 3.13 | 1.45 |
| EXAMPLE 8 | −1.18 | 4.48 | 0.40 | 0.75 | 1.68 | 1.68 |
| EXAMPLE 9 | −0.93 | 4.36 | 0.35 | 0.89 | 1.65 | 2.16 |
| EXAMPLE 10 | −0.82 | 4.59 | 0.40 | 0.69 | 1.06 | — |
| EXAMPLE 11 | −0.87 | 5.55 | 0.38 | 0.94 | 3.24 | 1.18 |
| EXAMPLE 12 | −1.18 | 4.01 | 0.47 | 0.61 | 1.15 | 2.50 |
| EXAMPLE 13 | −0.81 | 5.36 | 0.38 | 1.26 | 1.10 | 1.45 |
| EXAMPLE 14 | −1.28 | 4.01 | 0.42 | 0.91 | 1.78 | 1.79 |
| EXAMPLE 15 | −1.21 | 4.88 | 0.38 | 1.18 | 1.61 | 1.45 |

FIGS. 17 to 31 are aberration diagrams showing spherical aberration, astigmatism, distortion, and lateral chromatic aberration of the imaging lenses according to Examples 1 to 15. FIGS. 32 to 46 are diagrams showing comatic aberrations at each angle of view in the imaging lenses according to Examples 1 to 15. In the aberration diagrams, there are shown aberrations in which d-line (a wavelength 587.56 nm) is set as a reference wavelength. However, in the spherical aberration diagrams, the lateral chromatic aberration diagrams, and the comatic aberration diagrams, there are also shown aberrations at the F-line (a wavelength 486.1 nm), C-line (a wavelength 656.3 nm), and s-line (a wavelength 852.11 nm). In addition, the aberration diagram of distortion shows a deviation amount from an ideal image height expressed by f×tan θ, where f is the focal length of the whole system and θ(0≦θ≦ω) is the half angle of view. The FNo. in the spherical aberration diagram is an F number, the ω in the other aberration diagrams is a half angle of view.

As known from FIGS. 17 to 46, in Examples 1 to 15 mentioned above, the aberrations were satisfactorily corrected. In particular, in Examples 1 to 15 mentioned above, chromatic aberration was satisfactorily corrected in the wide wavelength range from the visible band to the infrared band.

In addition, in Examples 1 to 15 mentioned above, the optical system was configured to have an F number of 2.0, as a bight optical system appropriate to be applied to an onboard camera or a surveillance camera. On the contrary, in JP-2006-64829, JP-A-2006-91715 and JP-A-2006-91718, the optical system was configured to have an F number of 2.8, as an optical system too dark to be applied to an onboard camera or a surveillance camera.

Since the imaging lenses according to Examples 1 to 15 mentioned above have a good optical performance and can be downsized and unweighted, the imaging lenses are applicable to onboard cameras and the like in order to take images of the front, the side, and the rear of a vehicle.

Figure 47:
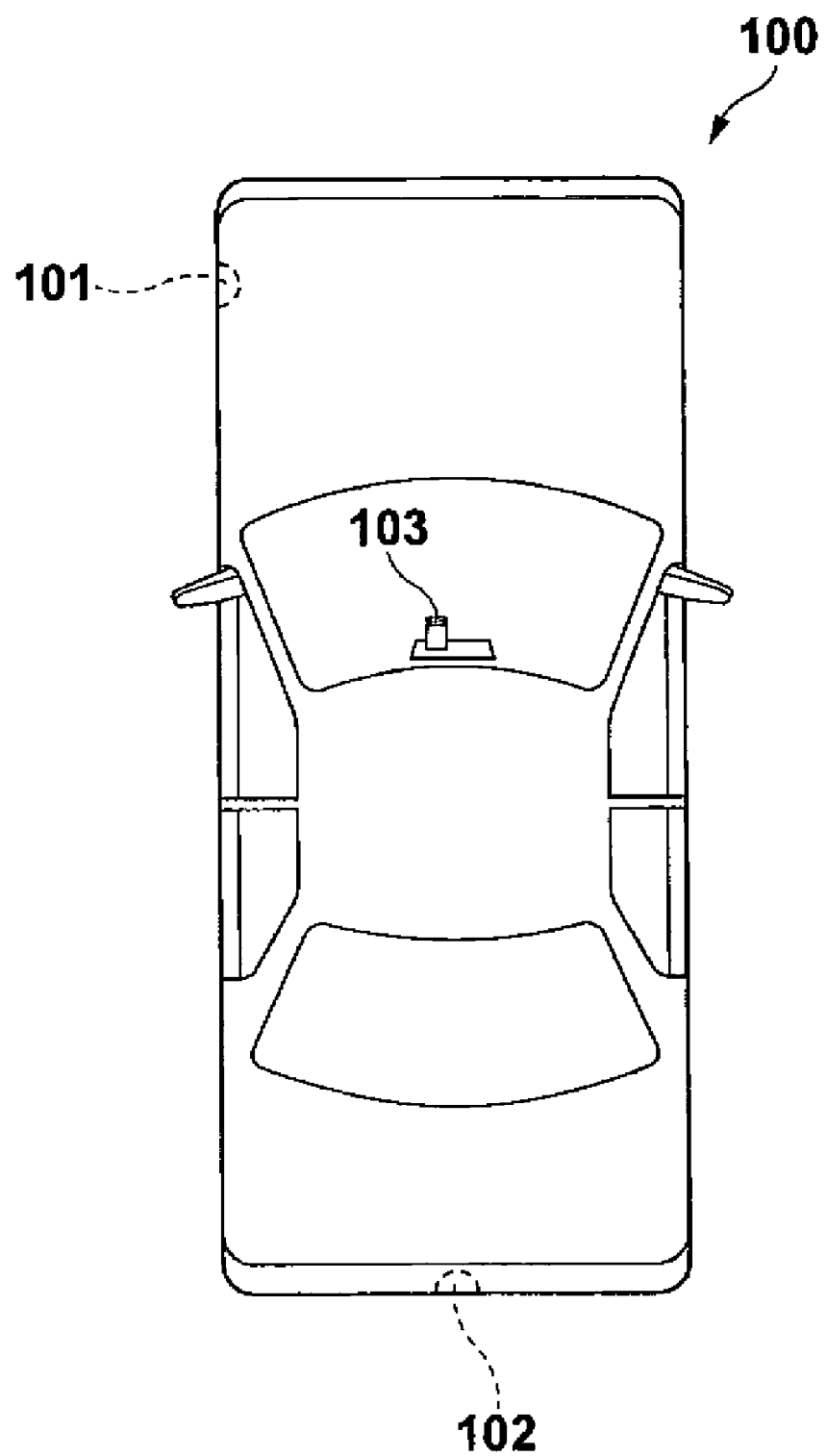
FIG. 47 is a diagram for explaining arrangement of an onboard imaging apparatus according to an exemplary embodiment of the invention.

As a use example, FIG. 47 shows a figure in which the imaging lens and the imaging apparatus according to the embodiment are mounted on a vehicle 100. In FIG. 47, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are imaging apparatuses, and include the imaging lens 1 according to the embodiment of the invention and the imaging device 5 converting an optical image formed by the imaging lens 1 into an electric signal.

As mentioned above, the imaging lens 1 according to the embodiment of the invention can achieve a decrease in size and weight and has good optical performance. Thus, it is possible to downsize and unweight the outside-vehicle cameras 101 and 102 and the in-vehicle camera 103, and it is also possible to form a good image on the imaging surface of the imaging device 5.

The invention has been described with reference to the embodiment and the examples, but the invention is not limited to the embodiment mentioned above, and may be modified to various forms. For example, the values of a radius of curvature, an on-axis surface spacing, and a refractive index of the lens components are not limited to the values noted in the numerical examples, and can have the other values.

In addition, in the embodiment of the imaging apparatus, the example in which the invention is applied to the onboard camera has been described with reference to the drawing, but the invention is not limited to this application, and is also applicable to, for example, a cell phone camera or a surveillance camera.

What is claimed is:

1. An imaging lens comprising: in order from an object side of the imaging lens,
 a first lens group having a positive power as a whole;
 a second lens group, wherein an object-side surface of a lens closest to the object side is concave toward the object side;
 a third lens group of a single lens having a positive power; and
 a fourth lens group having a negative power as a whole, wherein at least five lenses form said first, second, third and fourth lens groups,
 said imaging lens satisfying conditional expression:

$$3.5\ mm < D_2 < 6.0\ mm \qquad (8)$$

wherein $D_2$ represents a distance on an optical axis of the imaging lens from a surface closest to the object side to a surface closest to the image side in the second lens group.

2. The imaging lens according to claim 1, satisfying conditional expressions (1) and (2):

$$0.8 < L/f < 1.7 \qquad (1)$$

$$0.2 < Bf/f < 0.4 \qquad (2)$$

wherein L represents a distance on an optical axis of the imaging lens from a surface closest to the object side in the first lens group to an image plane, Bf represents a distance on the optical axis from a surface closest to an image side in a lens group that is closest to the image side of the imaging lens, to the image plane, and f represents a focal length of the imaging lens.

3. The imaging lens according to claim 1, wherein an image-side surface of a lens closest to the image side in the second lens group is convex toward the image side.

4. The imaging lens according to claim 1, wherein the second lens group is a cemented lens including, in order from the object side, a lens having a concave surface on the object side and a lens having a convex surface on the image side.

5. The imaging lens according to claim 1, wherein
 the first lens group is a single lens having a convex surface on the object side, and
 the fourth lens group is a cemented lens including, in order from the object side, a lens having a concave surface on the object side and a lens having a convex surface on the image side.

6. The imaging lens according to claim 1, wherein
 the first lens group is a single lens having a convex surface on the object side, and
 the fourth lens group is a single meniscus lens having a concave surface on the object side.

7. The imaging lens according to claim 1, satisfying conditional expression:

$$-1.0 < f/f_2 < 1.0 \qquad (3)$$

wherein $f_2$ represents a focal length of the second lens group, and f represents a focal length of the imaging lens.

8. The imaging lens according to claim 1, satisfying conditional expression:

$$0.3 < R_{2A}/R_{2B} < 1.5 \qquad (4)$$

wherein $R_{2A}$ represents a radius of curvature of a surface closest to the object side in the second lens group, and $R_{2B}$ represents a radius of curvature of a surface closest to the image side in the second lens group.

9. The imaging lens according to claim 1, wherein the second lens group includes a lens having a negative power, and an Abbe number of at least one negative lens included in the second lens group is 40 or less at the d-line.

10. The imaging lens according to claim 1, wherein a stop is disposed closer to the object side than a lens closest to the object side in the second lens group.

11. The imaging lens according to claim 1, satisfying conditional expression:

$$ENP/L < 0.5 \qquad (5)$$

wherein ENP represents a distance from a vertex of a surface closest to the object side in the first lens group to an entrance pupil, and L represents a distance on an optical axis of the imaging lens from a surface closest to the object side in the first lens group to an image plane.

12. The imaging lens according to claim 1, wherein the fourth group includes a cemented lens and satisfies conditional expression:

$$\nu_{F4}/\nu_{R4} > 1.0 \qquad (6)$$

wherein $\nu_{F4}$ represents an Abbe number of a lens closest to the object side in the cemented lens at the d-line, and $\nu_{R4}$ represents an Abbe number of a lens closest to the image side in the cemented lens at the d-line.

13. The imaging lens according to claim 1, satisfying conditional expression:

$$-3.0 < f_4/f < -0.5 \qquad (7)$$

wherein $f_4$ represents a focal length of the fourth lens group, and f represents a focal length of the imaging lens.

14. The imaging lens according to claim 1, having an effective diameter of 15 mm or less.

15. The imaging lens according to claim 1, satisfying conditional expression (1):

$$0.8 < L/f < 1.7 \qquad (1)$$

wherein L represents a distance on an optical axis of the imaging lens from a surface closest to the object side in the first lens group to an image plane, and f represents a focal length of the imaging lens.

16. The imaging lens according to claim 1, satisfying conditional expression (2):

$$0.2 < Bf/f < 0.4 \quad (2)$$

wherein Bf represents a distance on the optical axis from a surface closest to an image side in a lens group that is closest to the image side of the imaging lens, to the image plane, and f represents a focal length of the imaging lens.

17. An imaging apparatus comprising:
an imaging lens according to claim 1; and
an imaging device that converts an optical image formed by the imaging lens into an electric signal.

18. An imaging lens comprising: in order from an object side of the imaging lens,
a first lens group having a positive power as a whole;
a second lens group, wherein an object-side surface of a lens closest to the object side is concave toward the object side;
a third lens group of a single lens having a positive power; and
a fourth lens group having a negative power as a whole,
wherein at least five lenses form said first, second, third and fourth lens groups,
said imaging lens satisfying conditional expression:

$$1.39 \leq f_3/f < 3.5 \quad (11')$$

wherein $f_3$ is a focal length of the third lens group and f is the focal length of the imaging lens.

19. The imaging lens according to claim 18, satisfying conditional expression:

$$-1.0 < f/f_2 < 1.0 \quad (3)$$

wherein $f_2$ represents a focal length of the second lens group, and f represents a focal length of the imaging lens.

20. The imaging lens according to claim 18, satisfying conditional expression:

$$0.3 < R_{2A}/R_{2B} < 1.5 \quad (4)$$

wherein $R_{2A}$ represents a radius of curvature of a surface closest to the object side in the second lens group, and $R_{2B}$ represents a radius of curvature of a surface closest to the image side in the second lens group.

21. The imaging lens according to claim 18, wherein the fourth group includes a cemented lens and satisfies conditional expression:

$$v_{F4}/v_{R4} > 1.0 \quad (6)$$

wherein $v_{F4}$ represents an Abbe number of a lens closest to the object side in the cemented lens at the d-line, and $v_{R4}$ represents an Abbe number of a lens closest to the image side in the cemented lens at the d-line.

22. An imaging lens comprising: in order from an object side of the imaging lens,
a first lens group having a positive power as a whole;
a second lens group, wherein an object-side surface of a lens closest to the object side is concave toward the object side;
a third lens group of a single lens having a positive power; and
a fourth lens group having a negative power as a whole,
wherein at least five lenses form said first, second, third and fourth lens groups,
said imaging lens satisfying conditional expression:

$$0.8 < L/f < 1.7 \quad (1)$$

wherein L represents a distance on an optical axis of the imaging lens from a surface closest to the object side in the first lens group to an image plane, and f represents a focal length of the imaging lens.

23. The imaging lens according to claim 22, satisfying conditional expression:

$$-1.0 < f/f_2 < 1.0 \quad (3)$$

wherein $f_2$ represents a focal length of the second lens group, and f represents a focal length of the imaging lens.

24. The imaging lens according to claim 22, satisfying conditional expression:

$$0.3 < R_{2A}/R_{2B} < 1.5 \quad (4)$$

wherein $R_{2A}$ represents a radius of curvature of a surface closest to the object side in the second lens group, and $R_{2B}$ represents a radius of curvature of a surface closest to the image side in the second lens group.

25. The imaging lens according to claim 22, wherein the fourth group includes a cemented lens and satisfies conditional expression:

$$v_{F4}/v_{R4} > 1.0 \quad (6)$$

wherein $v_{F4}$ represents an Abbe number of a lens closest to the object side in the cemented lens at the d-line, and $v_{R4}$ represents an Abbe number of a lens closest to the image side in the cemented lens at the d-line.

26. An imaging lens comprising: in order from an object side of the imaging lens,
a first lens group having a positive power as a whole;
a second lens group, wherein an object-side surface of a lens closest to the object side is concave toward the object side;
a third lens group of a single lens having a positive power; and
a fourth lens group having a negative power as a whole,
wherein at least six lenses form said first, second, third and fourth lens groups,
said imaging lens satisfying conditional expression:

$$-3.0 < f_4/f < -0.81 \quad (7')$$

wherein $f_4$ represents a focal length of the fourth lens group, and f represents a focal length of the imaging lens.

27. The imaging lens according to claim 26, satisfying conditional expression:

$$-1.0 < f/f_2 < 1.0 \quad (3)$$

wherein $f_2$ represents a focal length of the second lens group, and f represents a focal length of the imaging lens.

28. The imaging lens according to claim 26, satisfying conditional expression:

$$0.3 < R_{2A}/R_{2B} < 1.5 \quad (4)$$

wherein $R_{2A}$ represents a radius of curvature of a surface closest to the object side in the second lens group, and $R_{2B}$ represents a radius of curvature of a surface closest to the image side in the second lens group.

29. The imaging lens according to claim 26, wherein the fourth group includes a cemented lens and satisfies conditional expression:

$$v_{F4}/v_{R4} > 1.0 \quad (6)$$

wherein $v_{F4}$ represents an Abbe number of a lens closest to the object side in the cemented lens at the d-line, and $v_{R4}$ represents an Abbe number of a lens closest to the image side in the cemented lens at the d-line.

* * * * *